(12) United States Patent
Mori

(10) Patent No.: US 9,013,811 B2
(45) Date of Patent: Apr. 21, 2015

(54) IMAGING LENS AND IMAGING APPARATUS USING THE SAME

(71) Applicant: FUJIFILM Corporation, Tokyo (JP)

(72) Inventor: Masao Mori, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/149,844

(22) Filed: Jan. 8, 2014

(65) Prior Publication Data

US 2014/0118849 A1    May 1, 2014

Related U.S. Application Data

(63) Continuation of application No. PCT/JP2012/004678, filed on Jul. 24, 2012.

(30) Foreign Application Priority Data

Jul. 28, 2011   (JP) .................. 2011-164909

(51) Int. Cl.
  *G02B 13/18* (2006.01)
  *G02B 9/04* (2006.01)
  *G02B 13/00* (2006.01)
  *G02B 13/04* (2006.01)

(52) U.S. Cl.
  CPC  *G02B 13/18* (2013.01); *G02B 9/04* (2013.01); *G02B 13/004* (2013.01); *G02B 13/04* (2013.01)

(58) Field of Classification Search
  CPC .............. G02B 9/00; G02B 9/34; G02B 9/38; G02B 9/56
  USPC .......... 359/708, 715, 749, 753, 771, 778, 781
  See application file for complete search history.

(56) References Cited

U.S. PATENT DOCUMENTS

| 4,781,449 | A  | 11/1988 | Hirakawa et al. |
| 5,691,853 | A  | 11/1997 | Miyano |
| 6,762,890 | B2 |  7/2004 | Sato et al. |

(Continued)

FOREIGN PATENT DOCUMENTS

| JP | 07-253536 | 10/1995 |
| JP | 08-106043 |  4/1996 |

(Continued)

OTHER PUBLICATIONS

International Search Report PCT/JP2012/004678 dated Oct. 16, 2012, with English Translation.

*Primary Examiner* — Scott J Sugarman
*Assistant Examiner* — William R Alexander
(74) *Attorney, Agent, or Firm* — Young & Thompson

(57) ABSTRACT

An imaging lens formed of 4 lenses, in which a negative first lens having a meniscus shape with a convex surface on the object side, a biconvex positive second lens, a negative third lens having a concave surface on the image side, and a positive fourth lens having a convex surface on the object side, arranged in order from the object side, and the imaging lens satisfies conditional expressions (1): $L12/f<0.82$; (2): $2.3<L12\times R2F^2/f^2<10.0$; (5): $-1.3<f1/f<-0.9$; and (6): $48<v1$ simultaneously, where, L12 is the air equivalent distance between the first lens and the second lens, f is the focal length of the entire lens system, R2F is the radius of curvature of the object side lens surface of the second lens, f1 is the focal length of the first lens, and v1 is the Abbe number of the first lens with respect to the d-line.

20 Claims, 21 Drawing Sheets

(56) References Cited

U.S. PATENT DOCUMENTS

| | | |
|---|---|---|
| 7,142,372 B2 | 11/2006 | Eguchi |
| 7,312,930 B2 | 12/2007 | Murakami et al. |
| 7,760,444 B2 * | 7/2010 | Iyama .................... 359/749 |
| 8,238,043 B2 | 8/2012 | Kubota |
| 2003/0161050 A1 * | 8/2003 | Sato et al. ............... 359/771 |
| 2009/0052053 A1 * | 2/2009 | Iyama .................... 359/691 |
| 2011/0128637 A1 | 6/2011 | Kubota |

FOREIGN PATENT DOCUMENTS

| | | |
|---|---|---|
| JP | 63-65416 | 3/1998 |
| JP | 10-300906 | 11/1998 |
| JP | 2002-244031 | 8/2002 |
| JP | 2006-184783 | 7/2006 |
| JP | 2006-317800 | 11/2006 |
| JP | 4416411 | 12/2009 |
| JP | 2011-118076 | 6/2011 |

* cited by examiner

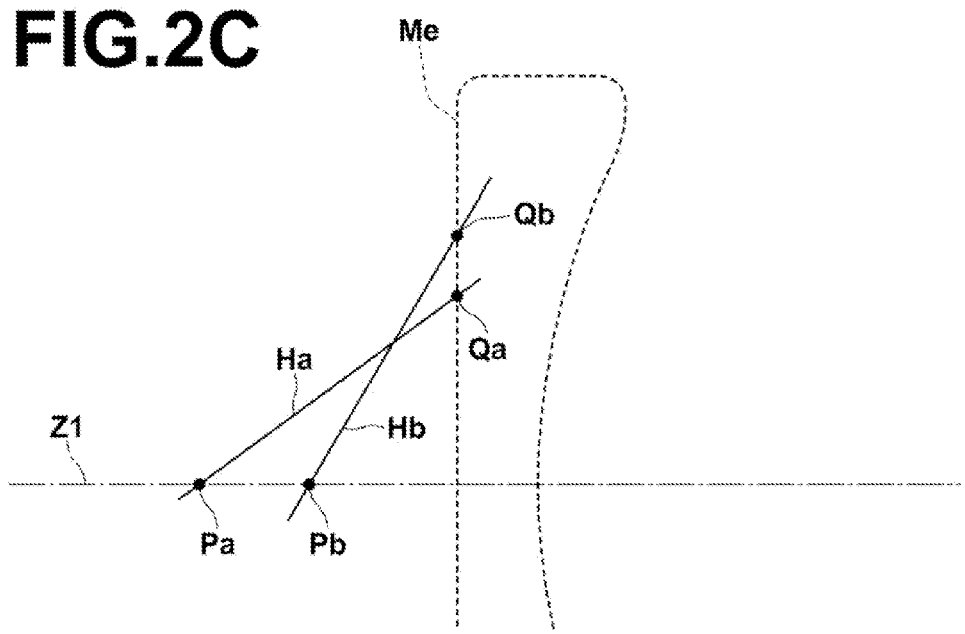

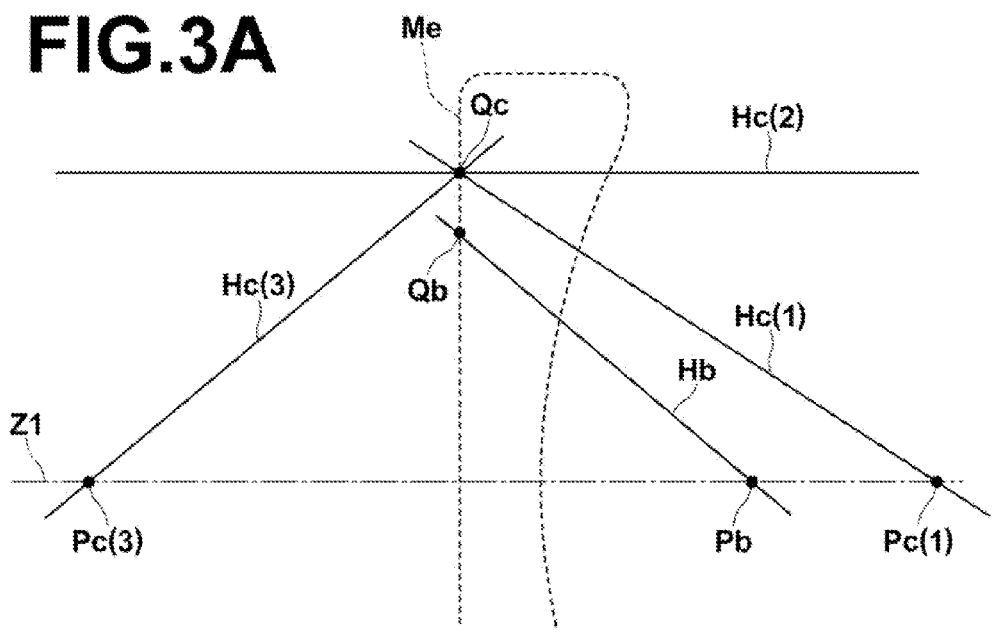
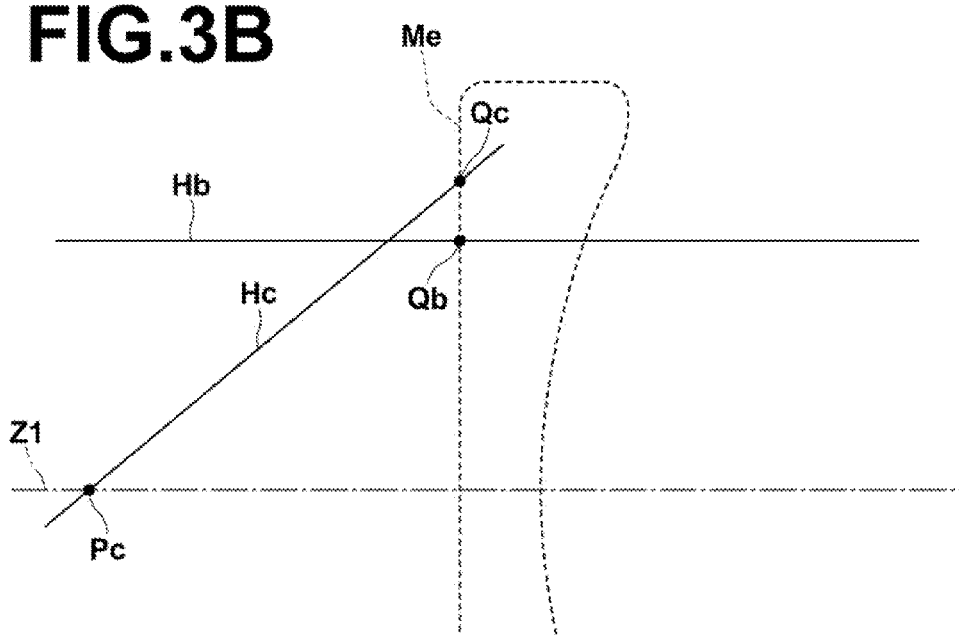

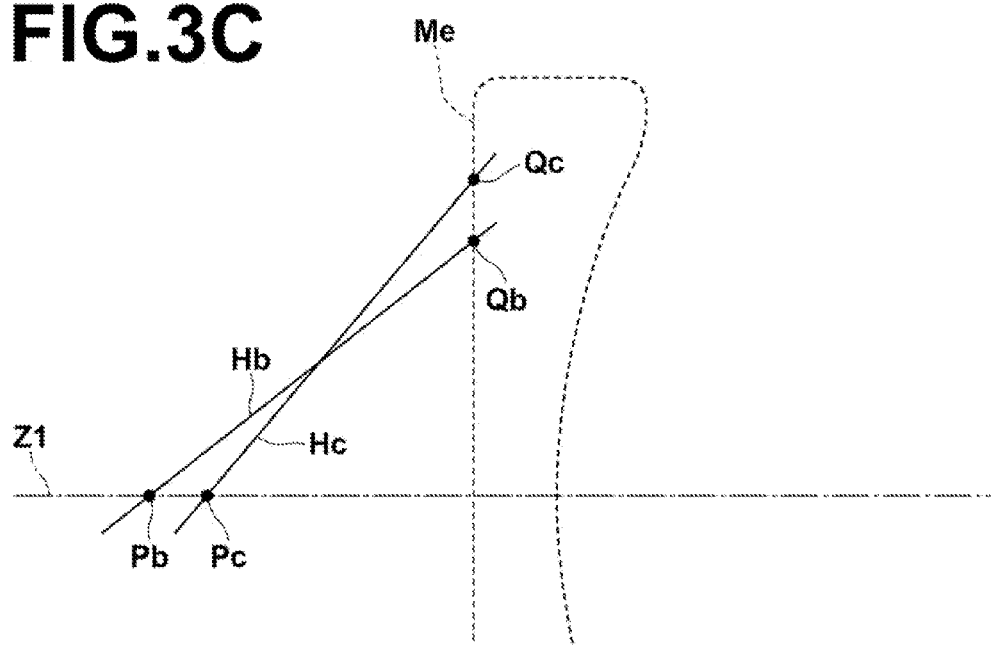

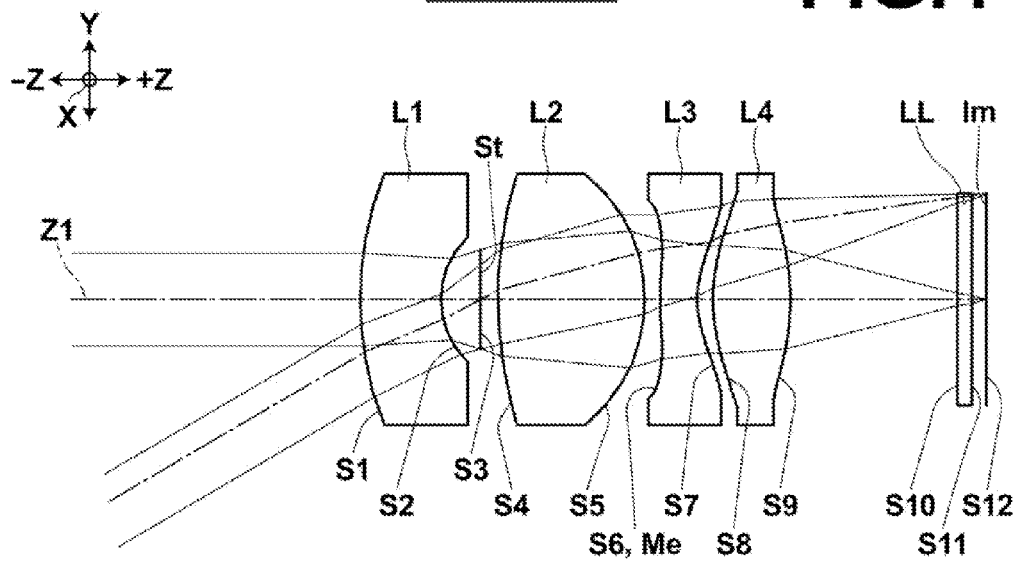
FIG.4 EXAMPLE 1
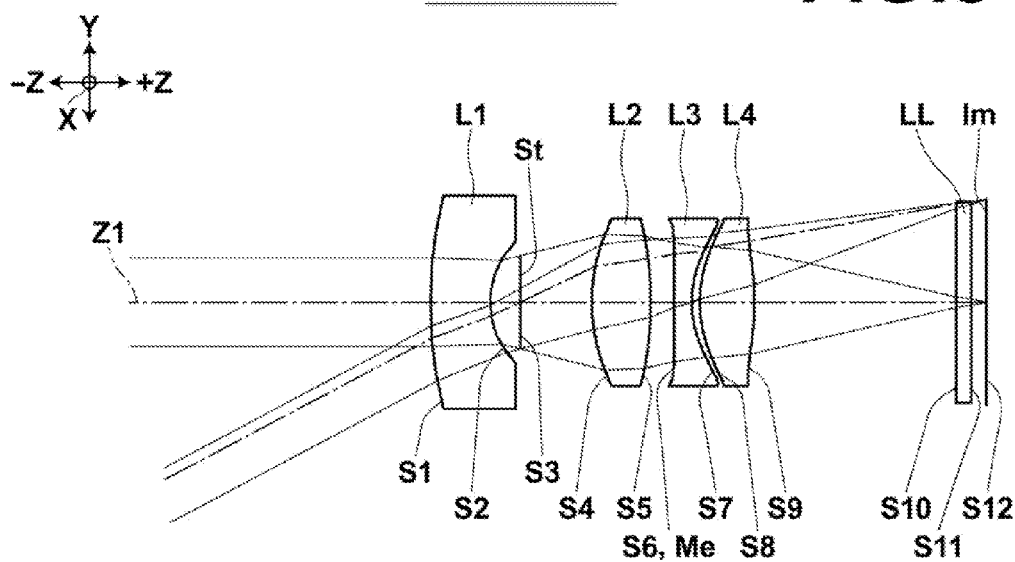
FIG.5 EXAMPLE 2

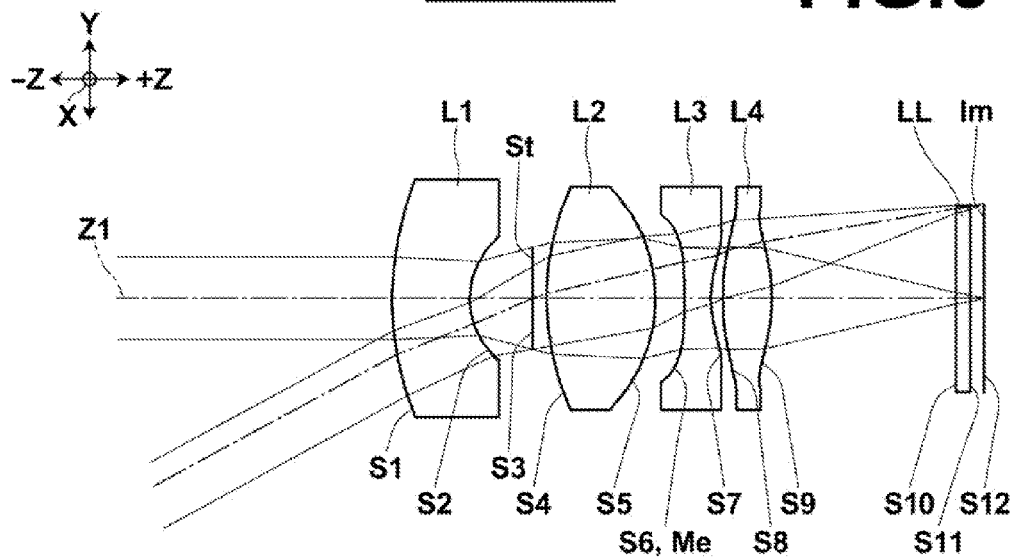
FIG.6 EXAMPLE 3
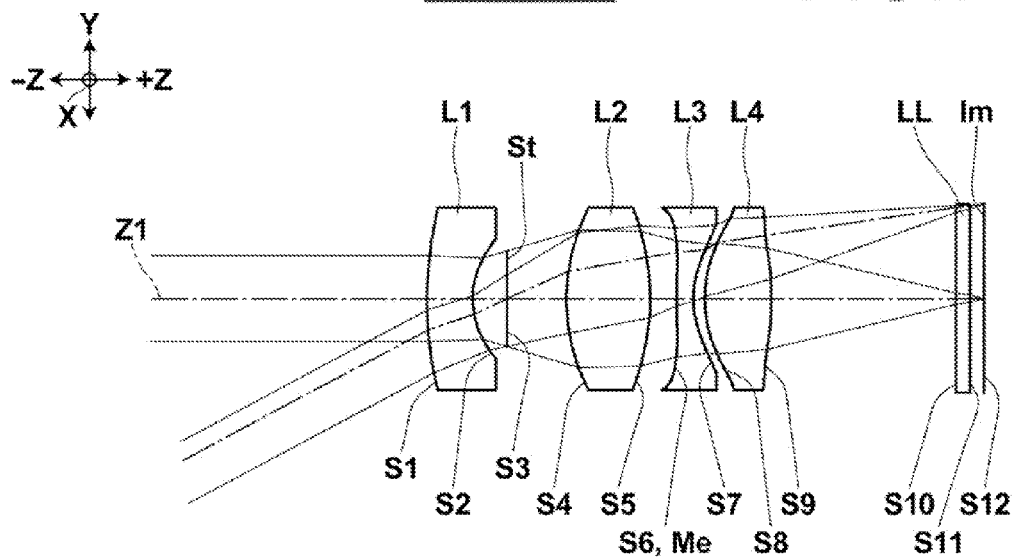
FIG.7 EXAMPLE 4

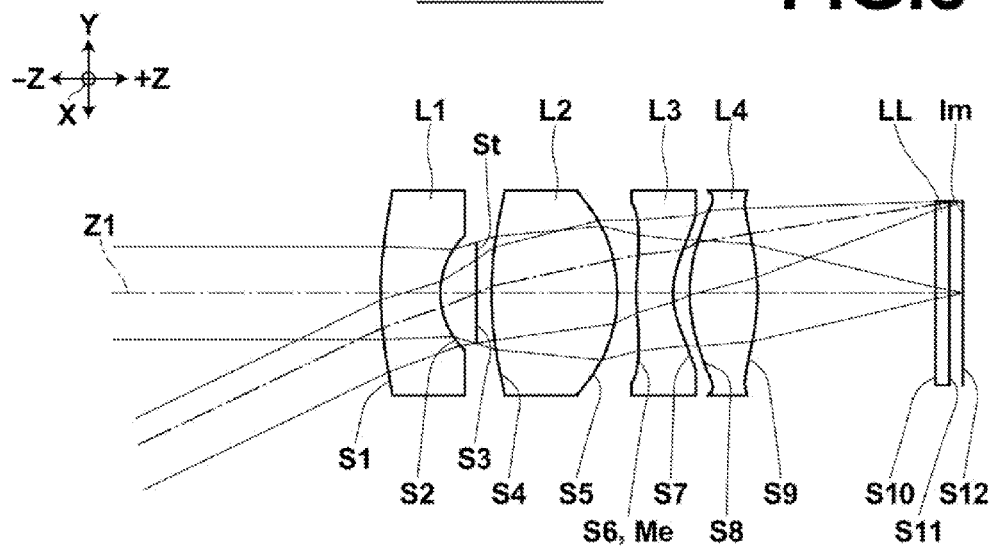
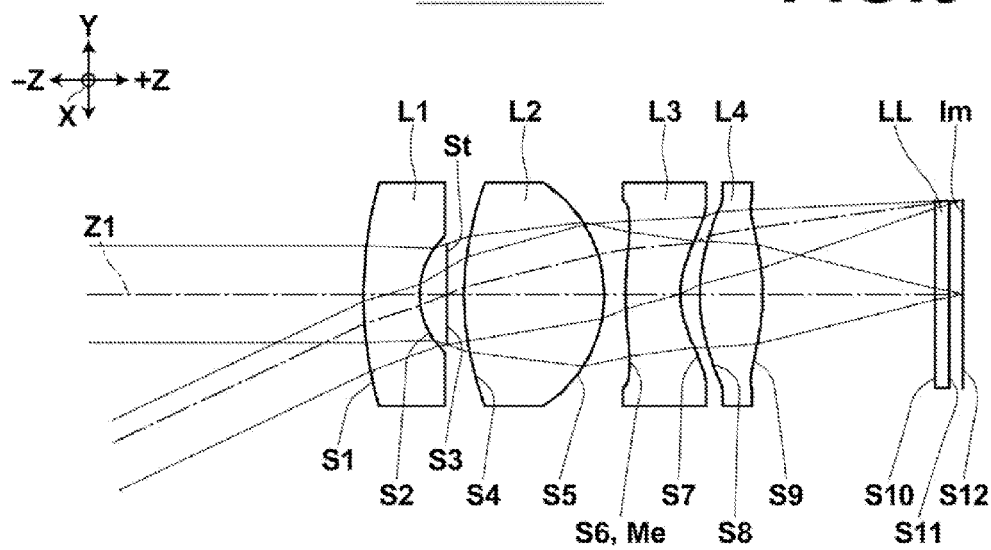

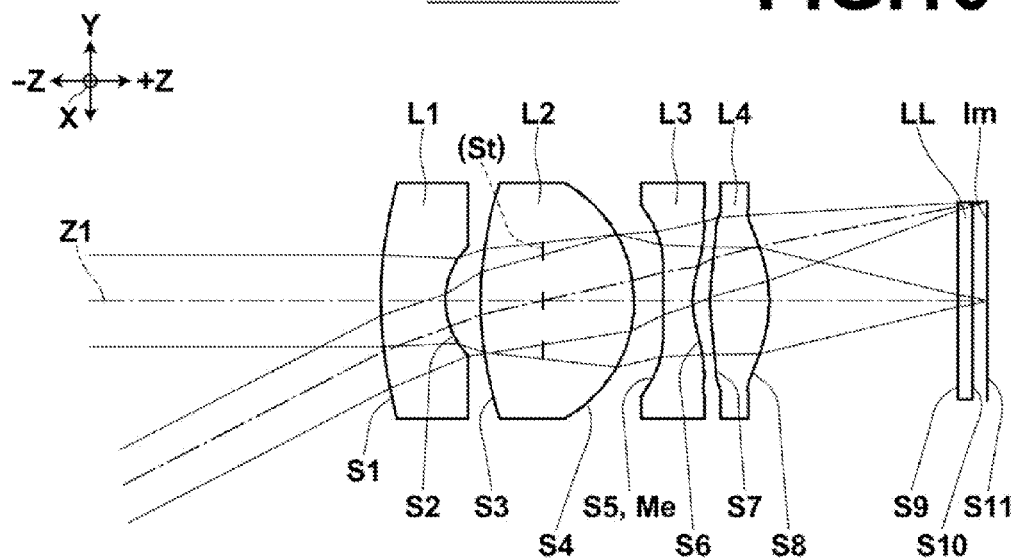
FIG.10 EXAMPLE 7

FIG.18    EXAMPLE 3
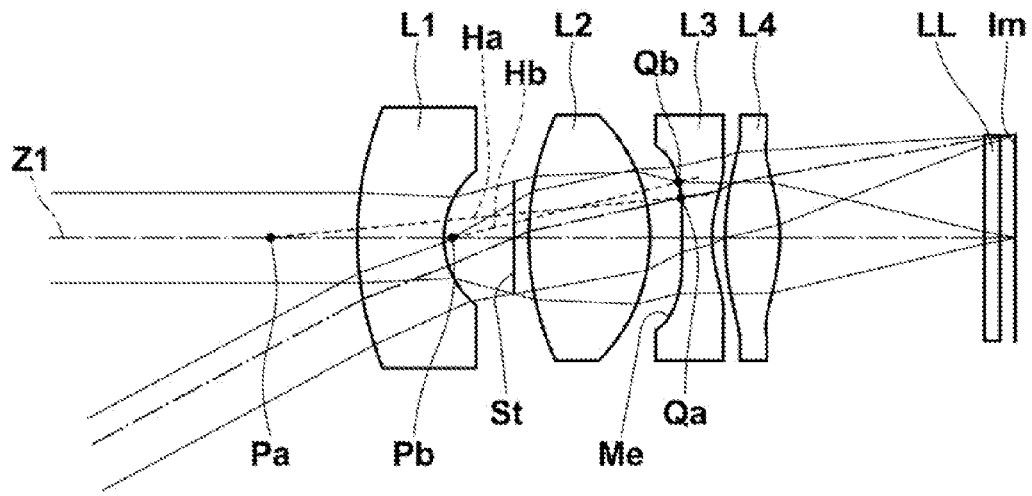
FIG.19    EXAMPLE 3
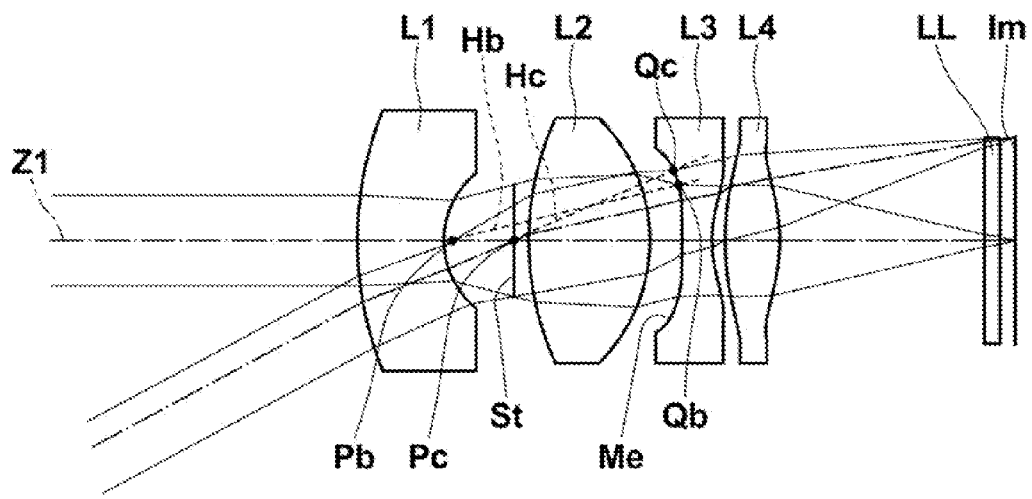

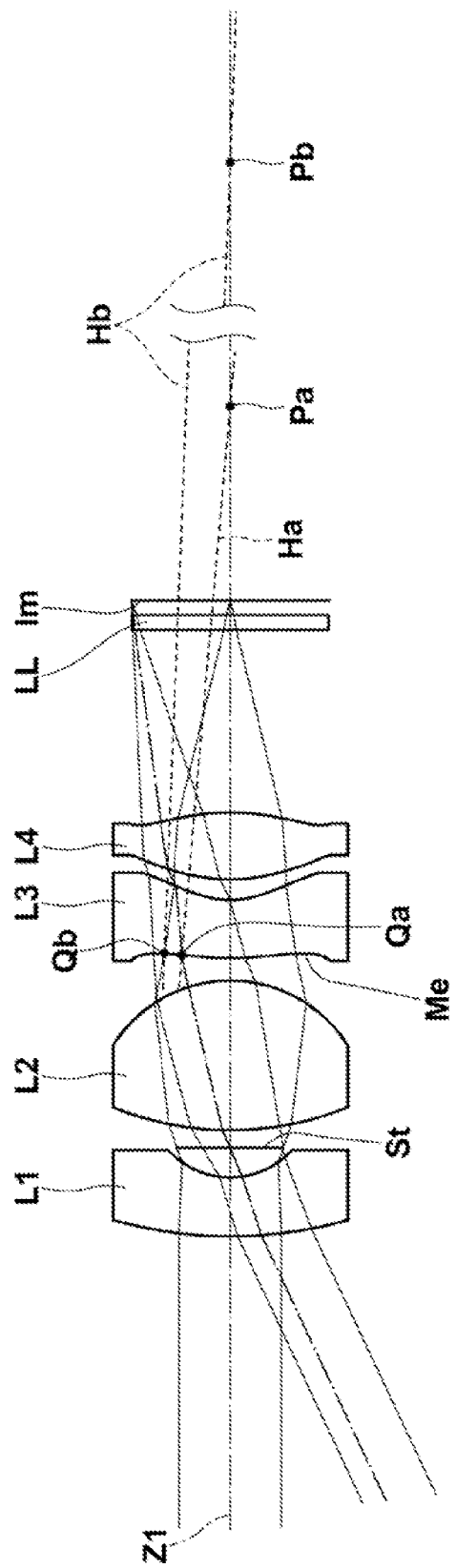
FIG.20 EXAMPLE 6

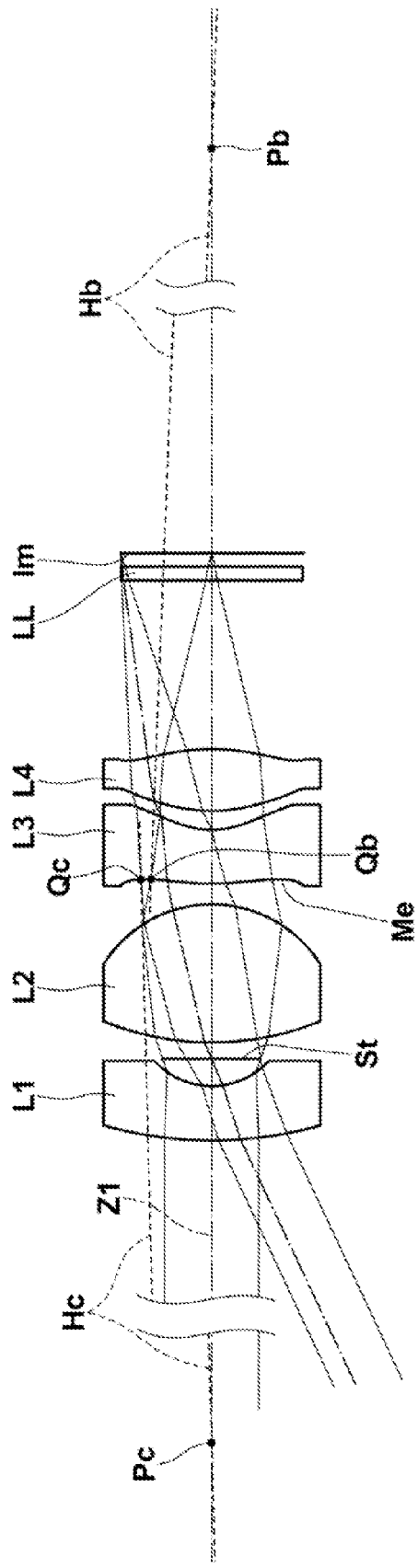
FIG.21 EXAMPLE 6

EXAMPLE 7

IMAGING LENS AND IMAGING APPARATUS USING THE SAME

TECHNICAL FIELD

The present invention relates to a single focus imaging lens composed of four lenses and an imaging apparatus using the same.

BACKGROUND ART

Heretofore, small and lightweight imaging devices which include a solid-state image sensor, such as a CCD, CMOS, or the like, and a single focus imaging lens have been known. Such imaging devices include, for example, digital cameras, surveillance cameras, in-vehicle cameras, image reading cameras for deficiency detection, individual identification, and the like. As imaging lenses that form an optical image on a light receiving surface of such solid-state image sensors, bright, low distortion, and high resolution imaging lenses while still having a simple structure with a small number of lenses and an appropriate back focus for inserting an optical element, such as a filter or the like, have been known (refer to Japanese Unexamined Patent Publication No. 10 (1998)-300906, Japanese Unexamined Patent Publication No. 2002-244031, U.S. Pat. No. 6,762,890, Japanese Patent No. 4416411, U.S. Pat. No. 7,312,930, Japanese Unexamined Patent Publication No. 2006-317800, and U.S. Pat. No. 7,142,372).

An imaging lens used for recording a color image, in particular, is preferably aberration-corrected such that, for example, each optical image with respect to each of the wavelength ranges of red (R), green (G), and blue (B) substantially corresponds to each other on the light receiving surface and such that the contrast of each optical image formed on the light receiving surface becomes equal to each other. This means that various types of aberrations need to be corrected satisfactorily in a wide wavelength region. More specifically, for example, an optical image of each color of RGB may be formed on the light receiving surface with high resolution by reducing the deviation of spherical aberration and longitudinal and lateral chromatic aberrations, and matching the image location (image plane) from the center of the optical image to periphery with respect to each color of RGB.

Further, in order to downsize the device, it is necessary to reduce the overall optical length (distance from the first surface of the imaging lens to the image plane of the imaging lens), as well as downsizing the imaging lens itself.

In a case where the angle of view of the imaging lens is broadened, it is necessary to shorten the focal length, but a significant focal length reduction may result in a reduced back focus. Therefore, in order to insert, for example, a low-pass filter, the imaging lens needs to be designed to have a large back focus in comparison with the focal length.

Further, in a camera that uses a solid-state image sensor, if the distance from the exit pupil of the imaging lens to the image plane is extremely short, the incident angle of an off-axis light beam on the light receiving surface becomes large and uneven illuminance is increased due to the effect of shading. Therefore, a lens system having telecentricity in which the image plane is sufficiently away from the exit pupil is used in an imaging lens used for forming an optical image on the light receiving surface of such solid-state image sensor.

As a means for realizing the telecentricity, use of a retrofocus type lens system formed of a lens system having a negative refractive power and a lens group having a positive refractive power arranged in order from the object side is known.

The retrofucus type lens system allows a long back focus in comparison with the focal length and the angle between the principal ray of an off-axis light beam and the optical axis may be reduced. This may provide a sufficient distance from the exit pupil of an imaging lens to the image plane of the imaging lens, so that it can be said that the employment of the retrofocus type lens system in an imaging lens that requires telecentricity is appropriate.

DISCLOSURE OF THE INVENTION

In the mean time, there is a demand for an imaging lens having improved optical performance, for example, improved resolution along with the densification of the image sensors.

The brightness of the imaging lens described in Japanese Unexamined Patent Publication No. 10 (1998)-300906, however, is dark with F5.58 and it is difficult to obtain a high contrast image. Further, it lacks appropriateness for downsizing because the overall optical length is long in comparison with the focal length.

The imaging lens described in Japanese Unexamined Patent Publication No. 2002-244031 has a large distortion and the resolution is degraded in a peripheral region. Further, as the overall optical length is long in comparison with the focal length, it lacks appropriateness for downsizing.

The imaging lenses described in U.S. Pat. No. 6,762,890 and Japanese Patent No. 4416411 have realized sufficient aberration correction and compactness by the use of an aspherical surface, but unable to comply with a brightness level of, for example, F2.2 and lacks telecentricity as the angle between the principal ray of off-axis light beam and the optical axis exceeds 10 degrees.

The imaging lenses described in U.S. Pat. No. 7,312,930 and Japanese Unexamined Patent Publication No. 2006-317800 are compact imaging lenses but the brightness is about F4 and lack telecentricity due to a short back focus.

The imaging lens described in U.S. Pat. No. 7,142,372 has achieved a brightness level of F2.8 but this also lacks telecentricity.

The present invention has been developed in view of the circumstances described above, and it is an object of the present invention to provide a compact and bright imaging lens having a wide angle of view and a long back focus, and an imaging apparatus using the same.

An imaging lens of the present invention is an imaging lens substantially consisting of four lenses, in which the imaging lens is composed of a first lens having a meniscus shape with a convex surface on the object side and a negative refractive power, a second lens having a biconvex shape and a positive refractive power, a third lens having a concave surface on the image side and a negative refractive power, and a fourth lens having a convex surface on the object side and a positive power arranged in order from the object side, and satisfies conditional expressions (1): $L12/f<0.82$ and (2): $2.3<L12 \times R2F^2/f^2<10.0$ simultaneously, where L12 is the distance (air equivalent distance) between the first lens and the second lens on the optical axis, f is the focal length of the entire lens system, and R2F is the radius of curvature of the object side lens surface of the second lens.

In the imaging lens described above, each of at least two of the first lens to the fourth lens may be an aspherical lens having an aspherical surface on one or both surfaces.

The imaging lens described above may be configured to satisfy a conditional expression (3): $0.7 < Bf/f < 1.5$, where Bf is the air equivalent back focus of the entire lens system.

The imaging lens described above may be formed to satisfy a conditional expression (4): $0.6 < f2/f < 1.1$ given below, where f2 is the focal length of the second lens.

The imaging lens described above may be formed to satisfy conditional expressions (5): $-1.3 < f1/f < -0.9$ and (6): $48 < v1$ simultaneously, where f1 is the focal length of the first lens and v1 is the Abbe number of the first lens with respect to the d-line.

In the imaging lens described above, the third lens and the fourth lens may be formed of a resin material and formed to satisfy a conditional expression (7): $-1.3 < f3/f4 < -0.8$, where f3 is the focal length of the third lens and f4 is the focal length of the fourth lens.

The object side surface of the third lens may have an aspherical shape formed such that:

in a case where a normal to the surface at a point where the principal ray of the outermost light beam passing through the imaging lens passes through the surface intersects with the optical axis at a point on the image side of the surface, a normal to the surface at a point where the outermost ray of the center light beam passing through the imaging lens passes through the surface intersects with the optical axis at a point on the image side of the intersecting point with the optical axis, becomes parallel to the optical axis, or intersects with the optical axis on the object side of the surface;

in a case where the normal to the surface at the point where the principal ray of the outermost light beam passes through the surface becomes parallel to the optical axis, the normal to the surface at the point where the outermost ray of the center light beam passes through the surface intersects with the optical axis on the object side of the surface; and in a case where the normal to the surface at the point where the principal ray of the outermost light beam passes through the surface intersects with the optical axis at a point on the object side of the surface, the normal to the surface at the point where the outermost ray of the center light beam passes through the surface intersects with the optical axis at a point on the image side of the intersecting point with the optical axis.

The object side surface of the third lens may have an aspherical shape formed such that:

in a case where a normal to the surface at a point where the outermost ray of the center light beam passing through the imaging lens passes through the surface intersects with the optical axis at a point on the image side of the surface, a normal to the surface at a point where the outermost ray of the outermost light beam passing through the imaging lens passes through the surface intersects with the optical axis at a point on the image side of the intersecting point with the optical axis, becomes parallel to the optical axis, or intersects with the optical axis on the object side of the surface; in a case where the normal to the surface at the point where the outermost ray of the center light beam passes through the surface becomes parallel to the optical axis, the normal to the surface at the point where the outermost ray of the outermost light beam passes through the surface intersects with the optical axis on the object side of the surface; and in a case where the normal to the surface at the point where the outermost ray of the center light beam passes through the surface intersects with the optical axis at a point on the object side of the surface, the normal to the surface at the point where the outermost ray of the outermost light beam passes through the surface intersects with the optical axis at a point on the image side of the intersecting point with the optical axis.

The imaging lens may be provided with an aperture stop between the first lens and the second lens.

The imaging apparatus of the present invention may include the imaging lens described above.

The term "an imaging lens substantially consisting of n lenses" as used herein refers to an imaging lens provided with a lens having substantially no refractive power, an optical element other than a lens, such as an aperture stop, a cover glass, or the like, a lens flange, a lens barrel, an image sensor, a mechanical component, such as a camera shake correction mechanism, and the like, in addition to the n lenses.

The air equivalent back focus is the distance (air equivalent distance) from the most image side lens surface of an imaging lens to the image side focal point of the imaging lens on the optical axis. In a case where an optical member having no refractive power, such as a filter, a cover glass, or the like is disposed between the most image side lens surface to the image plane, the air equivalent back focus is determined by air converting the thickness of the optical member.

If no optical member is disposed between the first lens and the second lens, the distance (air equivalent distance) between the first lens and the second lens on the optical axis is simply the air distance, while if an optical member having no refractive power is disposed between the first lens and the second lens, the distance is determined by air converting the thickness of the optical member.

The resin material described above is a resin material usable for a plastic lens and, for example, an acrylic resin, an epoxy resin, or a polycarbonate is preferably used.

According to the imaging lens and imaging apparatus of the present invention, four lenses are used which are disposed in the order of a negative first lens having a meniscus shape with a convex surface on the object side, a positive second lens having a biconvex shape, a negative third lens having a concave surface on the image side, and a positive fourth lens having a convex surface on the object side from the object side, and arranged to satisfy the conditional expression (1): $L12/f < 0.82$ and the conditional expression (2): $2.3 < L12 \times R2F^2/f^2 < 10.0$ simultaneously, so that a compact and bright optical system having a wide angle of view and a long back focus may be realized.

That is, the compactness may be realized by the use of a small number of lenses of four, the wide angle of view and the long back focus may both be realized by the use of a lens having a strong negative refractive power as the first lens, and satisfactory aberration correction may be implemented by gradually converging the light beam diffused through the first lens over the second lens to the fourth lens.

Further, if each of two or more of the first to the fourth Lenses is an aspherical lens having an aspherical surface on one or both surfaces, the design flexibility for improving various types of aberrations is increased, whereby further improved optical performance may be obtained.

BRIEF DESCRIPTION OF DRAWINGS

FIG. 2C illustrates intersections, normal lines, and the like for defining the shape of the object side surface of the third lens constituting the imaging lens in the case of 1C.

FIG. 3A illustrates intersections, normal lines, and the like for defining the shape of the object side surface of the third lens constituting the imaging lens in the case of 2A.

FIG. 3B illustrates intersections, normal lines, and the like for defining the shape of the object side surface of the third lens constituting the imaging lens in the case of 2B.

FIG. 3C illustrates intersections, normal lines, and the like for defining the shape of the object side surface of the third lens constituting the imaging lens in the case of 2C.

FIG. 4 is a cross-sectional view of an imaging lens of Example 1, illustrating schematic configuration thereof with optical paths.

FIG. 5 is a cross-sectional view of an imaging lens of Example 2, illustrating schematic configuration thereof with optical paths.

FIG. 6 is a cross-sectional view of an imaging lens of Example 3, illustrating schematic configuration thereof with optical paths.

FIG. 7 is a cross-sectional view of an imaging lens of Example 4, illustrating schematic configuration thereof with optical paths.

FIG. 8 is a cross-sectional view of an imaging lens of Example 5, illustrating schematic configuration thereof with optical paths.

FIG. 9 is a cross-sectional view of an imaging lens of Example 6, illustrating schematic configuration thereof with optical paths.

FIG. 10 is a cross-sectional view of an imaging lens of Example 7, illustrating schematic configuration thereof with optical paths.

FIG. 18 illustrates intersections, normal lines, and the like for defining the shape of the object side surface of the third lens of the imaging lens of Example 3.

FIG. 19 illustrates intersections, normal lines, and the like for defining the shape of the object side surface of the third lens of the imaging lens of Example 3.

FIG. 20 illustrates intersections, normal lines, and the like for defining the shape of the object side surface of the third lens of the imaging lens of Example 6.

FIG. 21 illustrates intersections, normal lines, and the like for defining the shape of the object side surface of the third lens of the imaging lens of Example 6.

BEST MODE FOR CARRYING OUT THE INVENTION

Hereinafter, an imaging lens of the present invention and an imaging apparatus equipped with the imaging lens will be described with reference to the accompanying drawings.

Figure 1:
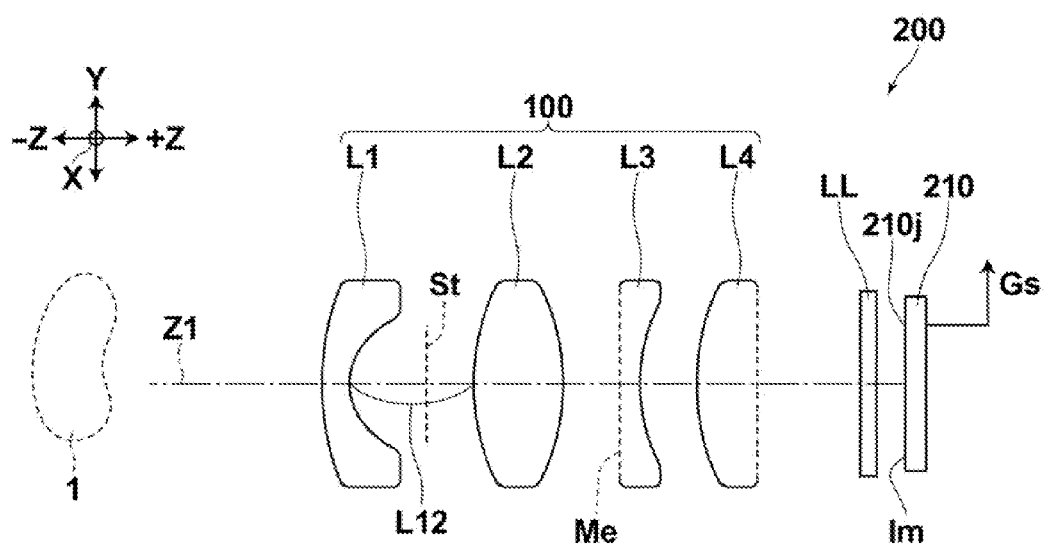
FIG. 1 is a cross-sectional view of an imaging lens according to an embodiment of the present invention, illustrating a schematic configuration thereof.

FIG. 1 is a cross-sectional view of an imaging apparatus equipped with an imaging lens of the present invention, illustrating a schematic configuration thereof. The arrows X, Y, and Z in the drawing indicate three orthogonal directions and the arrow Z direction indicates the same direction as that of the optical axis Z1.

An imaging apparatus 200 illustrated in the drawing includes an image sensor 210 which is a solid-state image sensor, such as a CCD, a CMOS, or the like, and a single focus imaging lens 100, and is used, for example, in digital cameras, surveillance cameras, in-vehicle cameras, image reading cameras for deficiency detection, individual identification, and the like.

The image sensor 210 converts an optical image Im representing a subject 1 formed on a light receiving surface 210J of the image sensor 210 through the imaging lens 100 to an electrical signal and outputs an image signal Gs representing the optical image Im.

The imaging lens 100 includes four lenses, in which the imaging lens is composed of a first lens L1 having a meniscus shape with a convex surface on the object side and a negative refractive power, a second lens L2 having a biconvex shape and a positive refractive power, a third lens L3 having a concave surface on the image side and a negative refractive power, and a fourth lens L4 having a convex shape on the object side and a positive power arranged in order from the object side, and satisfies a conditional expression (1): $L12/f<0.82$ and a conditional expression (2): $2.3<L12\times R2F/f^2<10.0$ simultaneously, where L12 is the distance (air equivalent distance) between the first lens L1 and the second lens L2 on the optical axis Z1, f is the focal length of the entire lens system, and R2F is the radius of curvature of the object side lens surface of the second lens L2. Note that the air equivalent distance described above is simply an air distance as no optical member is disposed between the first lens L1 and the second lens L2.

Here, the conditional expressions (1) and (2) are conditional expressions for obtaining satisfactory imaging performance while maintaining an appropriate back focus and compactness.

Satisfaction of the conditional expression (1) allows the downsizing of the lens. If the lens exceeds the upper limit of the conditional expression (1), the downsizing becomes difficult.

The imaging lens 100 is more preferably configured to satisfy a conditional expression (1a): $L12/f<0.6$.

Satisfaction of the conditional expression (2) results in satisfactory imaging performance while maintaining an appropriate back focus.

That is, in order to obtain an appropriate back focus, it is desirable to diffuse the center light beam by the strong negative refractive power of the first lens L1 and to cause the outermost ray of the center light beam to incident on a position away from the optical axis when the outermost ray is incident on the second lens L2. Satisfactory imaging performance may be obtained by correcting various types of aberrations by gradually converging the light beam diffused by the first lens L1 by the subsequent lenses from the second lens L2.

The increase in the distance L12 allows the outermost ray of the center light beam passing through the imaging lens 100 to be incident on a position of the second lens L2 away from the optical axis Z1. In order to achieve the downsizing with an increased distance L12, however, the diffused light beam from the first lens needs to be converged rapidly by the image side surface of the second lens and the radius of curvature of the image side surface needs to be reduced. If the effect of rapid convergence of the diverged light beam is increased in this way and the imaging lens 100 falls below the lower limit of the conditional expression (2), the angle formed between the incident ray on the second lens L2 and the normal to the object side surface at the position where the incident ray passes through the object side surface of the second lens L2 is increased and high-order coma aberrations occur at a peripheral region of the light beam, thereby causing it difficult to obtain satisfactory imaging performance.

Contrary to this, if a priority is given to the compactness by reducing the distance L12, it is necessary to give a further strong diffusing effect to the first lens L1. In order to direct such strongly diffused light beam toward convergence while maintaining satisfactory optical performance, the radius of curvature of the object side surface of the second lens L2 needs to be increased so that the angle formed between the incident ray on the second lens L2 and the normal to the object side surface at the position where the incident ray passes through the object side surface of the second lens L2 does not become large. If the radius of curvature is increased and the upper limit of the conditional expression (2) is exceeded, the convergence effect of the object side surface of the second lens L2 becomes weak and the subsequent surfaces need to have strong convergence effects, whereby the design flexibility is decreased and satisfactory aberration correction becomes difficult. The imaging lens 100 is more preferably configured to satisfy a conditional expression (2a): $3.0<L12\times R2F^2/f^2<8.0$.

Further, the imaging lens 100 may have the following configurations.

In the imaging lens 100, each of two or more lenses of the first lens L1, the second lens L2, the third lens L3, and the fourth lens L4 may be an aspherical lens having an aspherical shape on one or both surfaces.

Further, the imaging lens 100 may be configured to satisfy a conditional expression (3): $0.7<Bf/f<1.5$, where Bf is the air equivalent back focus of the entire lens system.

The conditional expression (3) is an expression that defines the range of back focus.

If the imaging lens 100 exceeds the upper limit of the conditional expression (3), the downsizing becomes difficult. On the other hand, if the imaging lens 100 falls below the lower limit of the conditional expression (3), the distance between the imaging lens 100 and the light receiving surface 210J is reduced, resulting in insufficient telecentricity, in addition to reduced freedom for inserting filters between the imaging lens 100 and the light receiving surface 210J. Further, if the imaging lens 100 falls below the lower limit of the conditional expression (3), a return light beam reflected from the light receiving surface 210J is reflected at the imaging lens 100, a holding member holding each lens of the imaging lens 100, and the like, and these light beams are incident on the light receiving surface 210J again as stray light beams, so that the imaging performance is likely to be deteriorated.

The imaging lens 100 is more preferably configured to satisfy a conditional expression (3a): $0.85<Bf/f<1.25$.

The imaging lens 100 may be configured to satisfy a conditional expression (4): $0.6<f2/f<1.1$, where f2 is the focal length of the second lens L2.

The conditional expression (4): $0.6<f2/f<1.1$ is an expression that defines the power of the second lens L2.

If the imaging lens 100 exceeds the upper limit of the conditional expression (4) and the power of the second lens L2 becomes weak, the convergence effect of the second lens L2 also becomes weak.

In order to compensate for this, if the distance between the second lens L2 and the third lens L3 is increased, the downsizing becomes difficult. Further, in order to compensate for this, if the convergence effect of the fourth lens is increased, a large negative spherical aberration occurs and satisfactory optical performance can not be obtained.

On the other hand, if the imaging lens 100 is configured to fall below the lower limit of the conditional expression (4), a sufficient back focus may not be obtained if, for example, the power of the second lens L2 is increased more than a predetermined value.

If the diffusion effect by the negative power of the third lens L3 is increased in order to obtain a sufficient back focus, the positive power of the fourth lens L4 also needs to be increased and aberration correction of off-axis light beam at a peripheral region becomes difficult.

The imaging lens 100 is more preferably configured to satisfy a conditional expression (4a): $0.7<f2/f<0.9$.

When the radius of curvature of the object side surface of the second lens L2 is taken as R2F and the radius of curvature of the image side surface of the second lens is taken as R23, the imaging lens 100 preferably satisfies a conditional expression (8): $1.0<R2F/|R2B|$.

That is, by forming the second lens L2 such that the radius of curvature of the object side surface is greater than the absolute value of the image side surface of the second lens 12, the distance between the first lens L1 and the second lens L2 may be reduced, and the light beam diffused by the first lens L1 can be gradually converged while achieving the downsizing, so that satisfactory aberration correction becomes possible.

If the imaging lens 100 exceeds the upper limit of the conditional expression (8), the convergence effect of the object side surface of the second lens L2 is reduced and, in order to cause a strong convergence effect on the image side surface of the second lens L2, the radius of curvature of the image side surface becomes too small, resulting in insufficient aberration correction, such as coma aberration and field curvature, in a peripheral light beam.

The imaging lens 100 is more preferably configured to satisfy a conditional expression (8a): $1.0<R2F/|R2B|<3.0$. The imaging lens 100 may be configured to simultaneously satisfy a conditional expression (5): $-1.3<f1/f<-0.9$ and a conditional expression (6): $48<v1$, where f1 is the focal length of the first lens L1 and v1 is the Abbe number of the first lens L1 with respect to the d-line.

The conditional expression (5) is an expression that defines the power of the first lens L1.

If the imaging lens 100 is configured to fall below the lower limit of the conditional expression (5) and if, for example, the power of the first lens L is weak, the diffusion effect of the light beam by the first lens L1 is reduced and maintenance of an appropriate back focus becomes difficult. Further, the distance between the first lens L1 and the second lens L2 is increased, and the downsizing becomes difficult.

If the imaging lens 100 is configured to exceed the upper limit of the conditional expression (5), for example, while gradually converging the light beam strongly diffused by the first lens L1 by the subsequent lenses from the second lens L2, the downsizing needs to be achieved by reducing the radius of curvature on the object side of the second lens L2. Consequently, higher order coma aberrations occur at a peripheral region of the light beam and satisfactory optical performance becomes difficult to obtain.

The imaging lens 100 is more preferably configured to satisfy a conditional expression (5a): $-1.2<f1/f<-1.0$.

The conditional expression (6): $48<v1$ is an expression that defines the Abbe number of the first lens L1.

Satisfaction of the conditional expression (6) allows satisfactory correction of chromatic aberrations and high imaging performance may be obtained.

The imaging lens 100 is more preferably configured to satisfy a conditional expression (6a): 48<ν1<82.

If the upper limit of the conditional expression (6a) is satisfied, a relatively inexpensive optical material may be selected as the first lens L1.

The third lens L3 and the fourth lens L4 of the imaging lens 100 may be formed of a resin material and the imaging lens 100 may be configured to satisfy a conditional expression (7): −1.3<f3/f4<−0.8, where f3 is the focal length of the third lens L3 and f4 is the focal length of the fourth lens L4.

Resin materials have large variations in refractive index and shape with respect to temperature change in comparison with glass materials and the focal shift of the lens at the time of temperature change is great. Therefore, in a case where resin lenses are used, resin lenses are preferably used for two lenses of positive and negative powers. That is, configuration of the imaging lens 100 so as to satisfy the conditional expression (7) allows the impact of the resin lenses due to temperature change to be cancelled by the two resin lenses of positive and negative powers.

The imaging lens 100 is more preferably configured to satisfy a conditional expression (7a): −1.2<f3/f4<−0.9.

The object side surface Me of the third lens is preferably formed in a shape such that, for example, a convex shape is gradually strengthened in a central region and the convex shape is gradually weakened in a peripheral region.

That is, with respect to the aspherical shape of the image side surface Me of the third lens, an aspherical surface expression: $Zf(y) = C \cdot y^2 / [1 + (1 - K \cdot C^2 \cdot y^2)^{1/2}] + \Sigma B_n \cdot |y|^n$ is defined, where y is the height in a direction orthogonal to the optical axis Z1 (arrow Y direction in the drawing), Zf (y) is the distance in the optical axis direction from the tangent plane of the apex of the aspherical surface at the height y (depth of the aspherical surface), C is the paraxial curvature, K is the aspherical coefficient representing a quadric surface (e.g., eccentricity or conic constant), $B_n$ is $n^{th}$ (n is an integer greater than or equal to 3) order aspherical coefficient.

In that case, the shape of the surface Me should be formed in an aspherical shape such that, in the region 0≤y, the first derivation dZf(y)/dy of the aspherical surface expression Zf(y) takes a positive value in the central region and the positive value is gradually increased in the central region and gradually decreased in the peripheral region with increase in the value of y.

In this way, by forming the object side surface Me of the third lens in an aspherical shape such that a convex shape is gradually strengthened in the central region toward the peripheral region, for a ray of those near the central region when the center light beam passes through the object side surface Me of the third lens L3, the angle formed by the ray and the normal to the surface Me at the point where the ray passes through the surface Me (intersection between the ray and the surface Me) may be reduced. Further, for a ray near the peripheral region, the angle formed by the ray and the normal to the surface Me at the point where the ray passes through the surface Me (intersection between the ray and the surface Me) may be gradually increased.

This allows a large negative spherical aberration that occurs, in particular, in the peripheral region when the rays diffused by the first lens L1 are converged by the second lens L2 to be satisfactorily corrected.

Further, the aspherical shape in which the convex shape is gradually weakened allows, in particular, the convex shape at the peripheral region of the object side surface Me of the third lens L3 to be loosened for a light beam passing through the peripheral region and the angle formed between a ray passing through the peripheral region and the normal at the point where the ray passes through the surface Me (intersection between the ray and the surface Me) may be reduced, so that occurrence of higher order coma aberration may be inhibited.

Further preferably, the peripheral region of the object side surface Me of the third lens L3 has a concave shape.

That is, the shape of the surface Me should be formed in an aspherical shape such that, in the region 0≤y, the first derivation dZf(y)/dy of the aspherical surface expression Zf(y) takes a positive value in the central region and the positive value is gradually increased with increase in the value of y in the central region, then gradually decreased toward the peripheral region, takes the extreme value 0 at arbitrary y, then takes a negative value, and the negative value is gradually increased with increase in the value of y further toward the peripheral region.

The range of shapes of the object side surface Me of the third lens L3 constituting the imaging lens 100 will now be described with reference to FIGS. 2A, 2B, 2C. Note that FIGS. 2A, 2B, 2C and FIGS. 3A, 3B, 3C to be described later are conceptual diagrams and do not accurately represent the shapes of the surface Me, the directions of the normals to the surface Me, and the like.

Figure 2A:
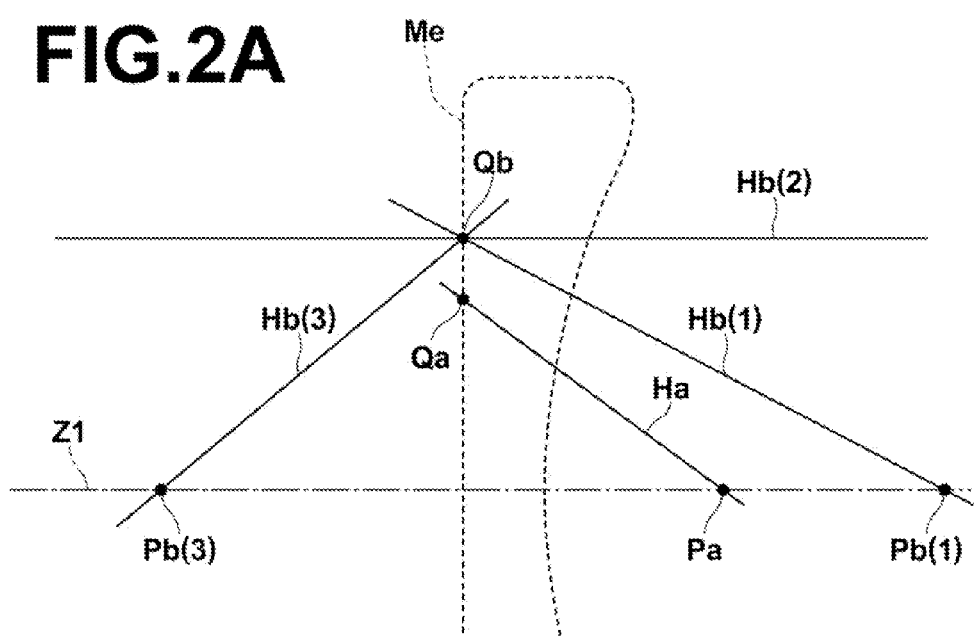
FIG. 2A illustrates intersections, normal lines, and the like for defining the shape of the object side surface of a third lens constituting the imaging lens in the case of 1A.
Figure 2B:
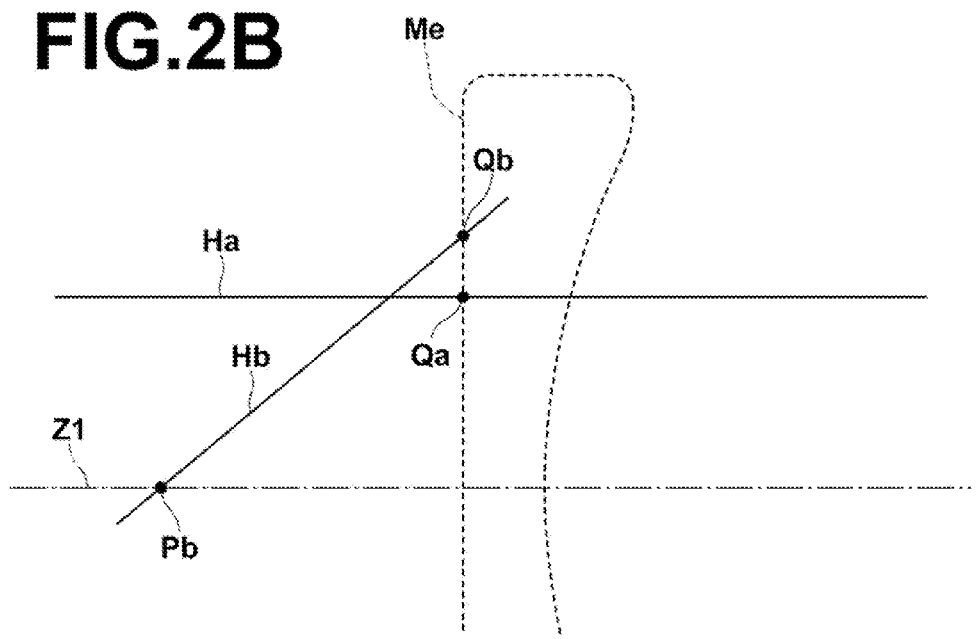
FIG. 2B illustrates intersections, normal lines, and the like for defining the shape of the object side surface of the third lens constituting the imaging lens in the case of 1B.

FIGS. 2A, 2B, 2C are drawings that indicate intersections, normals, and the like for defining the shape of the object side surface of the third lens constituting the imaging lens.

As illustrated in FIG. 2A, the object side surface Me of the third lens L3 may have an aspherical shape formed such that, in a case where a normal Ha to the surface Me "at an intersection Qa between the principal ray of the outermost light beam passing through the imaging lens 100 and the surface Me" intersects with the optical axis Z1 at a point Pa on the image side of the surface Me (in the case of 1-A state), a normal to the surface Me "at an intersection Qb between the outermost ray of the center light beam and the surface Me" intersects with the optical axis Z1 at a point Pb (1) on the image side of the point Pa (normal Hb(1) in the drawing), becomes parallel to the optical axis Z1 (normal Hb(2) in the drawing), or intersects with the optical axis Z1 at a point Pb(3) on the object side of the surface Me (normal Hb(3) in the drawing).

Further, as illustrated in FIG. 2B, the object side surface Me of the third lens L3 may have an aspherical shape formed such that, in a case where a normal Ha to the surface Me "at an intersection Qa between the principal ray of the outermost light beam passing through the imaging lens 100 and the surface Me" is parallel to the optical axis Z1 (in the case of 1-B state), a normal Hb to the surface Me "at an intersection Qb between the outermost ray of the center light beam passing through the imaging lens 100 and the surface Me" intersects with the optical axis Z1 at a point Pb on the object side of the surface Me.

Still further, as illustrated in FIG. 2C, the object side surface Me of the third lens L3 may have an aspherical shape formed such that, in a case where a normal Ha to the surface Me "at the intersection Qa between the principal ray of the outermost light beam passing through the imaging lens 100 and the surface Me" intersects with the optical axis Z1 at a point Pa on the object side of the surface Me (in the case of 1-C state), a normal Hb to the Me "at an intersection Qb between the outermost ray of the center light beam passing through the imaging lens 100 and the surface Me" intersects with the optical axis Z1 at a point Pb on the image side of the point Pa.

Further, the range of shapes of the object side surface Me of the third lens L3 constituting the imaging lens 100 will be described with reference to FIGS. 3A, 3B, 3C.

FIGS. 3A, 3B, 3C are drawings that indicate intersections, normals, and the like for defining the shape of the object side surface of the third lens constituting the imaging lens.

As illustrated in FIG. 3A, the object side surface Me of the third lens L3 may have an aspherical shape formed such that, in a case where a normal Hb to the surface Me "at an intersection Qb between the outermost ray of the center light beam passing through the imaging lens 100 and the surface Me" intersects with the optical axis Z1 at a point Pb on the image side of the surface Me (in the case of 2-A state), a normal to the surface Me "at an intersection Qc between outermost ray of the outermost light beam passing through the imaging lens 100 and the surface Me" intersects with the optical axis Z1 at a point Pc (1) on the image side of the point Pb (normal Hc (1) in the drawing), becomes parallel to the optical axis Z1 (normal Hc (2) in the drawing), or intersects with the optical axis Z1 at a point Pc(3) on the object side of the surface Me.

Further, as illustrated in FIG. 3B, the object side surface Me of the third lens L3 may have an aspherical shape formed such that, in a case where a normal Hb to the surface Me "at an intersection Qb between the outermost ray of the center light beam passing through the imaging lens 100 and the surface Me" is parallel to the optical axis Z1 (in the case of 2-B state), a normal He to the surface Me "at an intersection Qc between the outermost ray of the outermost light beam passing through the imaging lens 100 and the surface Me" intersects with the optical axis Z1 at a point Pc on the object side of the surface Me.

Still further, as illustrated in FIG. 3C, the object side surface Me of the third lens L3 may have an aspherical shape formed such that, in a case where a normal Hb to the surface Me "at an intersection Qb between the outermost ray of the center light beam passing through the imaging lens 100 and the surface Me" intersects with the optical axis Z1 at a point Pb on the object side of the surface Me (in the case of 2-C state), a normal He to the surface Me "at an intersection Qc between the outermost ray of the outermost light beam passing through the imaging lens 100 and the surface Me" intersects with the optical axis Z1 at a point Pc on the image side of the point Pb.

Further, the imaging lens 100 may be provided with an aperture stop between the first lens L1 and the second lens L2.

The aperture stop St that determines brightness of the lens is preferably disposed between the first lens L1 and the second lens L2 in order to enhance the telecentricity. Such arrangement allows the distance between the light receiving surface 210J and the pupil position to be increased whereby the design flexibility is increased and the burden for setting a telecentric system may be reduced. That is, the imaging lens 100 is preferably configured by taking into account the telecentricity.

If the incident angle on the light receiving surface 210J becomes too large, the amount of receiving light can not be obtained efficiently and unevenness occurs in the amount of receiving light due to the effect of shading. Therefore consideration should be given to the incident angle.

The degree of telecentricity required for the imaging lens 100 depends on the specifications of the apparatus in which the imaging lens is used but, when the maximum value of the incident angle of the principal ray of each light beam on the image plane is taken as MXAN, MXAN<15° is preferable. Further, MXAN<10° is more preferable. In the examples of a plurality of imaging lenses to be described later, most of the examples satisfy MXAN<10°.

If the imaging lens 100 is installed, for example, in a surveillance camera and used under an environment in which it is directly exposed to an open air, the first lens L1 is preferably formed of a glass material. A glass material is less affected by moisture and ultraviolet rays, and resistant to scratching, so that it is useful for the first lens L1.

The second lens L2 needs to have a strong positive refractive power to bear most of the focusing function of the entire lens system. Therefore, it is useful to use glass materials from which a high refractive index material can be selected for the second lens L2 from the viewpoint of aberration correction.

For example, an infrared cut filter, a visible light cut filter, and a filter having a water repellent or hydrophilic coating may be disposed on the object side or on the image side of the imaging lens. Further, a coating having such functions may be applied to the lens surface.

The imaging lens 100 may be used, for example, as an image reading optical system of finite system.

Further, the imaging lens 100 may be applied not only to an apparatus that takes visible light as the imaging target but also an apparatus that takes infrared light as the imaging target. The imaging lens 100 may be used, for example, in a night vision camera, an authentication camera, and the like.

In a case where the imaging lens 100 is applied to a surveillance camera or the like installed outdoors, a stray light beam due to a ray incident on the imaging lens 100 from an angle exceeding the angle of view of the imaging lens 100 may affect the resolution of an image obtained by the surveillance camera. In order to prevent such stray light, a hood or a stopper stop for cutting unwanted rays is preferably provided in front of the imaging lens 100 or between each lens.

EXAMPLES

Examples 1 to 7 representing specific numerical data of the imaging lens according to the present invention will be described collectively with reference to FIGS. 4 to 10, FIGS. 11 to 17, FIGS. 18 to 22, Tables 1A, 1B, 2A, 2B, - - - 7A, 7B and Tables 8, 9. Reference symbols in FIGS. 4 to 10 corresponding to those in FIG. 1 illustrating the imaging lens 100 indicate corresponding components to each other. The arrows X, Y, and Z in FIG. 4 to 10 indicate three orthogonal directions and the arrow Z direction indicates the same direction as that of the optical axis Z1.

Example 1

FIG. 4 is a cross-sectional view of an imaging lens of Example 1, schematically illustrating the configuration thereof with optical paths of light beams passing through the imaging lens.

The imaging lens of Example 1 is configured to satisfy all of the conditional expressions (1) to (7), and the conditional expression (8).

Table 1A shows lens data of the imaging lens of Example 1. In the lens data shown in Table 1A, the surface number i represents $i^{th}$ surface number Si in which a number i (i=1, 2, 3, - - - ) is given to each surface in a serially increasing manner toward the image side with the surface on the most object side being taken as the first surface. In Table 1A, the surface number is given also to an aperture stop St, an optical element LL having no power, and an image plane on which an optical image Im is formed.

The symbol Ri in Table 1A represents the radius of curvature of $i^{th}$ (i=1, 2, 3, - - - ) surface and the symbol Di represents the surface distance between $i^{th}$ surface and $(i+1)^{th}$ surface on the optical axis Z1. The symbols Ri and Di correspond to the symbol Si (i=1, 2, 3, - - - ) in number.

The symbol re in Table 1A represents the light beam control diameter which corresponds to an optical stop or a flare stop diameter for removing coma flare and maintaining high performance. Note that the value 0.000 appearing in the re column in Table 1A indicates that no light beam control is provided.

The symbol Ndj represents the refractive index of $j^{th}$ optical element with respect to the d-line (587.6 nm) in which a number j (j=1, 2, 3, - - - ) is given to each optical element in a serially increasing manner toward the image side with the optical element on the most object side being taken as the first optical element, and vdj represents the Abbe number of $j^{th}$ optical element with reference to the d-line. In Table 1A, the unit of the radius of curvature and the surface distance is mm, and the radius of curvature is positive if the surface is convex on the object side and negative if it is convex on the image side.

In the lens data shown in Table 1A, * mark is attached to the surface number of an aspherical surface and the value of the radius of curvature Ri is the value of paraxial radius of curvature.

Table 1B shows aspherical coefficients of the imaging lens of Example 1. That is, Table 1B shows aspherical coefficients of aspherical surfaces whose surface numbers are given * marks in Table 1A.

The aspherical coefficients described in Table 1B are created such that aspherical shapes are defined when applied to the aspherical expression given below.

$$Zf(y) = C \cdot y^2 / \{(1+(1-K \cdot C \cdot y^2)^{1/2}\} + \Sigma Bn \cdot |y|^n$$

where:

Zf(y): depth of aspherical surface (mm)

y: distance (height) from the optical axis to the lens surface (mm)

K: aspherical coefficient representing quadric surface

C: paraxial curvature=1/R (R: paraxial radius of curvature)

Bn: $n^{th}$ order (n is an integer greater than or equal 3) aspherical coefficient

TABLE 1B

Example 1: Aspherical Coefficients

| Variable Symbols | Surface Number i | | | |
|---|---|---|---|---|
| | *6 | *7 | *8 | *9 |
| C | 7.7366446172E−02 | 3.2667995165E−01 | 1.6799946240E−01 | −1.5047323833E−01 |
| K | 0.0000000000E+00 | 0.0000000000E+00 | −3.1504000000E+00 | −5.2470000000E+00 |
| B3 | 1.4919628550E−03 | 3.6632168680E−03 | 6.2876148910E−03 | 1.0343311110E−02 |
| B4 | −7.2376569120E−03 | −8.8181137010E−03 | −2.5443508490E−03 | −1.2248019320E−02 |
| B5 | −9.9417353450E−04 | −8.6773867300E−04 | 2.0514907720E−03 | 4.4666164990E−03 |
| B6 | 7.7911501860E−06 | −5.6630437880E−05 | 8.4696735890E−05 | 4.6063764380E−04 |
| B7 | 1.9115458610E−05 | −3.4141606160E−04 | 1.5075363340E−04 | −6.7327845150E−04 |
| B8 | −9.2250056020E−07 | 1.5076868150E−04 | −8.7598066900E−04 | 1.1960451570E−04 |
| B9 | 6.2300670420E−05 | 5.3268742840E−05 | 4.1173960110E−04 | 0.0000000000E+00 |
| B10 | −1.8285851940E−05 | −1.8319324270E−05 | −5.3785772500E−05 | 0.0000000000E+00 |

Because such optical systems as described above may generally maintain the predetermined performance even when the sizes of the optical elements, such as lenses and the like, are proportionally increased or decreased, imaging lenses in which the entire lens data described above are proportionally increased or decreased may also be the examples according to the present invention.

TABLE 1A

Example 1
Lens Data

| Si | Ri | Di | re | Ndj | νdj |
|---|---|---|---|---|---|
| 1 | 9.9999 | 2.7830 | 0.000 | 1.58913 | 61.14 |
| 2 | 2.6452 | 1.3500 | 0.000 | | |
| (St) 3 | ∞ | 0.6080 | 3.170 | | |
| 4 | 12.3100 | 5.0320 | 0.000 | 1.75500 | 52.32 |
| 5 | −4.9054 | 0.5500 | 5.400 | | |
| *6 | 12.9255 | 1.2620 | 0.000 | 1.63360 | 23.59 |
| *7 | 3.0611 | 0.5450 | 0.000 | | |
| *8 | 5.9524 | 2.6500 | 0.000 | 1.53391 | 55.96 |
| *9 | −6.6457 | 5.7253 | 0.000 | | |
| 10 | ∞ | 0.5000 | 0.000 | 1.51680 | 64.2 |
| 11 | ∞ | 0.5000 | 0.000 | | |
| 12 | ∞ | ∞ | 0.000 | | |

※1. Third surface is aperture stop, twelfth surface is image plane, and tenth to eleventh surface are cover glass, filter, an the like.
※2. *mark indicates aspherical surface.
※3. re is light beam control diameter (third surface is optical aperture stop, fifth surface is flare stop diameter for removing coma flare that occurs in peripheral region and maintaining high performance, and 0.0 indicates no light beam control is provided)

AS is known from the lens data described above, the imaging lens of Example 1 is a compact and bright imaging lens having a wide angle of view and a long back focus.

Figure 11:
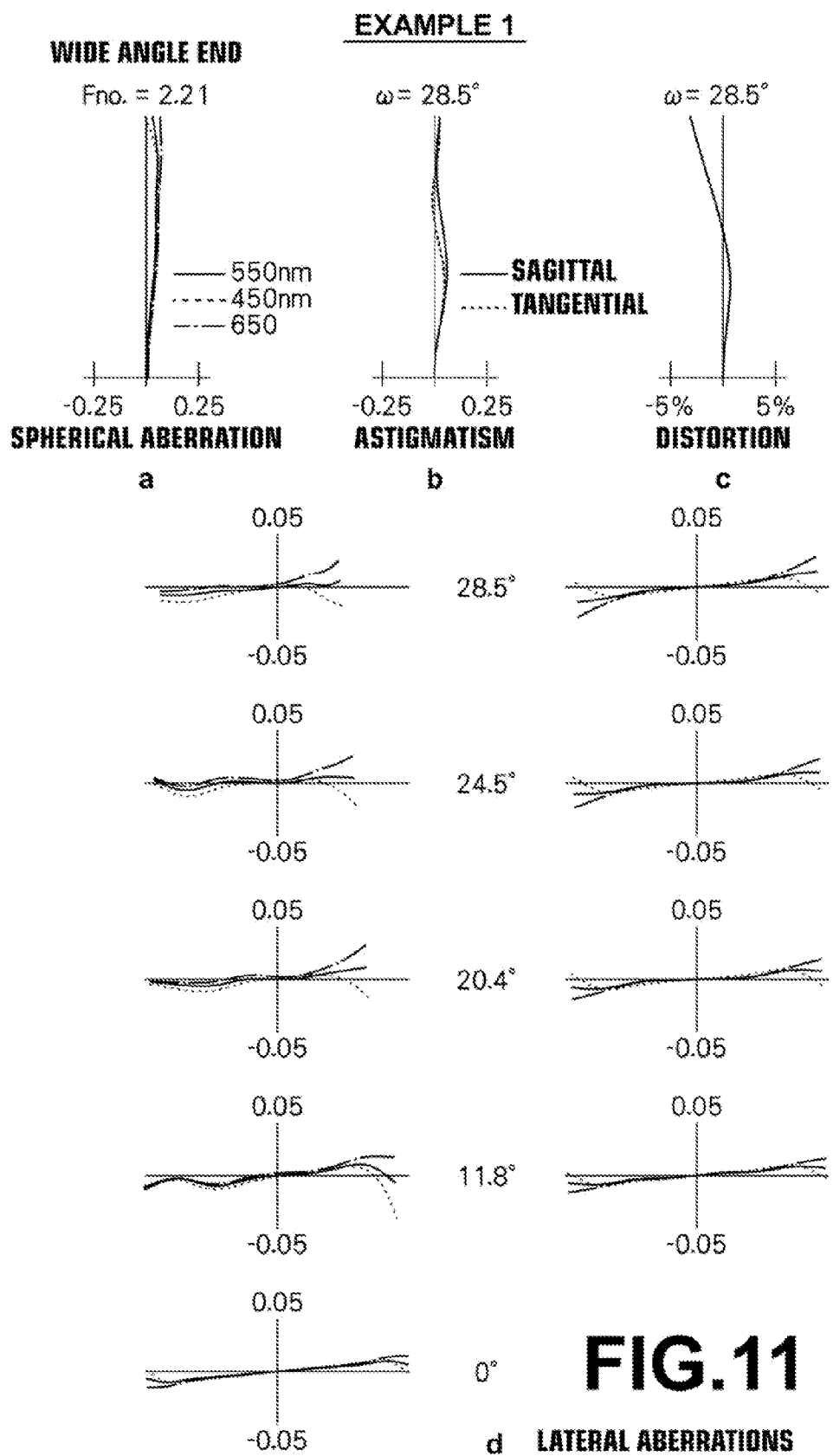
FIG. 11 illustrates aberration diagrams of the imaging lens of Example 1.

FIG. 11 illustrates aberration diagrams of the imaging lens of Example 1. The diagrams of spherical aberration, astigmatism, distortion (distortion aberration) are shown on the upper side of FIG. 11 and lateral aberrations are shown on the lower side. The diagram denoted by the symbol A illustrates the spherical aberration, the diagram denoted by the symbol B illustrates the astigmatism, the diagram denoted by the symbol C illustrates the distortion, and the diagram denoted by the symbol D illustrates the lateral aberrations.

FIG. 11 illustrates various types of aberrations for the light having each wavelength of 450 nm, 550 nm, and 650 nm.

In the diagram of astigmatism, the solid line illustrates aberration in the sagittal direction and the broken line illustrates aberration in the tangential direction. FNo. on the upper side of the spherical aberration diagram represents F-number and ω on the upper side of the other aberration diagrams represents the half angle of view.

In the lateral aberration diagram, aberration diagrams in the left column illustrate aberrations in the tangential direction while those in the right column illustrate aberrations in the sagittal direction.

Further, values corresponding to each formula in the conditional expressions (1) to (8) for each of the imaging lenses of Examples 1 to 7 are shown in Table 8. Further, values corresponding to each variable symbol in the conditional expressions (1) to (8) are shown in FIG. 9. The value of the formula described in each conditional expression can be obtained from the lens data shown in Table 1 and the like.

Note that the above descriptions of how to interpret FIG. 4 illustrating the configuration of the imaging lens of Example 1, FIG. 11 of the aberration diagrams, FIGS. 8 and 9 related to the conditional expressions (1) to (8) apply to Examples 2 to 7 to be described later, so that the descriptions are omitted for the Examples to be described later.

Example 2

FIG. 5 is a cross-sectional view of an imaging lens of Example 2, schematically illustrating the configuration thereof with the optical paths of center light beam and outermost light beam passing through the imaging lens.

The imaging lens of Example 2 is configured to satisfy the conditional expressions (1) to (7).

Figure 12:
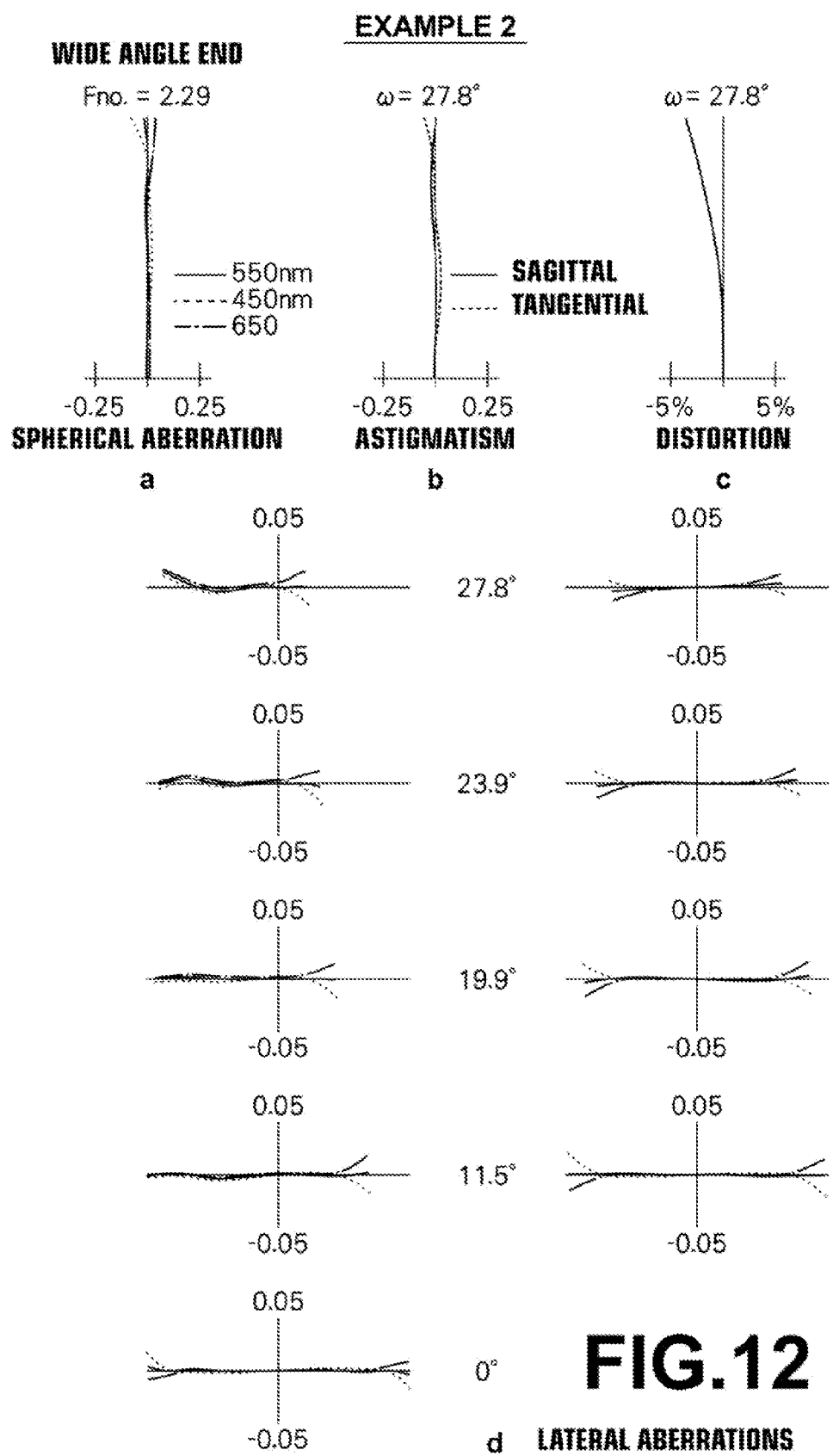
FIG. 12 illustrates aberration diagrams of the imaging lens of Example 2.

FIG. 12 illustrates aberrations of the imaging lens of Example 2.

Table 2A below shows lens data of the imaging lens of Example 2 and Table 2B shows aspherical coefficients of the imaging lens of Example 2.

TABLE 2A

Example 2
Lens Data

| Si | Ri | Di | re | Ndj | νdj |
|---|---|---|---|---|---|
| 1 | 14.2857 | 1.9720 | 0.000 | 1.48749 | 70.23 |
| 2 | 2.7714 | 1.0010 | 0.000 | | |
| (St) 3 | ∞ | 2.3720 | 3.060 | | |
| *4 | 6.0035 | 1.9440 | 0.000 | 1.77250 | 49.6 |
| *5 | −12.3259 | 0.7560 | 4.600 | | |
| *6 | 48.8450 | 0.6000 | 4.200 | 1.63360 | 23.59 |
| *7 | 3.8759 | 0.2690 | 0.000 | | |
| *8 | 5.5625 | 1.8030 | 0.000 | 1.53391 | 55.96 |
| *9 | −7.3751 | 6.6570 | 0.000 | | |
| 10 | ∞ | 0.5000 | 0.000 | 1.51680 | 64.2 |
| 11 | ∞ | 0.5000 | 0.000 | | |
| 12 | ∞ | 0.0000 | 0.000 | | |

※1. Third surface is aperture stop, twelfth surface is image plane, and tenth to eleventh surface are cover glass, filter, an the like.
※2. *mark indicates aspherical surface.
※3. re is light beam control diameter (third surface is optical aperture stop, fifth surface is flare stop diameter for removing coma flare that occurs in peripheral region and maintaining high performance, and 0.0 indicates no light beam control is provided)

Example 3

FIG. 6 is a cross-sectional view of an imaging lens of Example 3, schematically illustrating the configuration thereof with the optical paths of center light beam and outermost light beam passing through the imaging lens.

The imaging lens of Example 3 is configured to satisfy the conditional expressions (1) to (7) and conditional expression (8).

Figure 13:
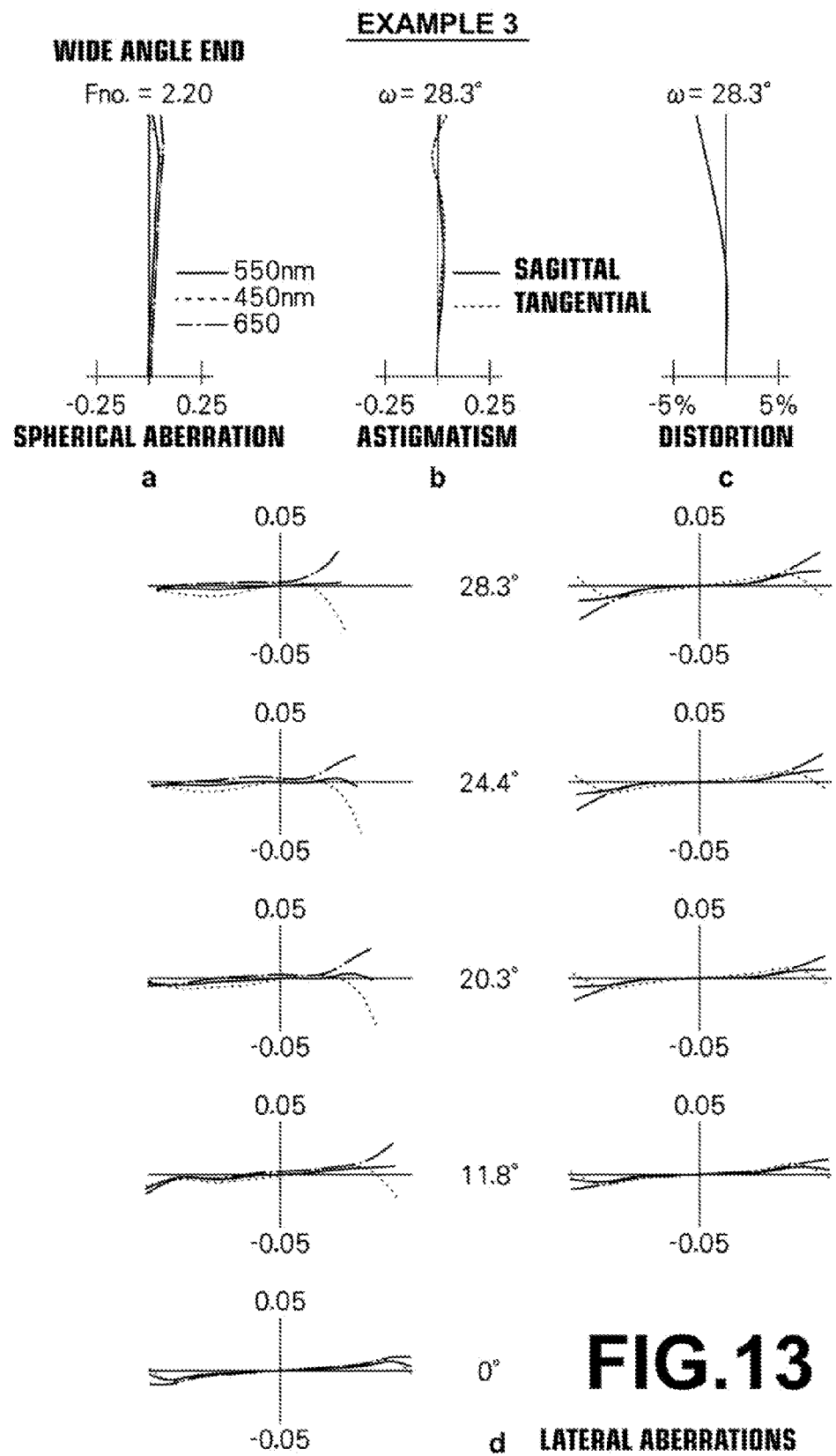
FIG. 13 illustrates aberration diagrams of the imaging lens of Example 3.

FIG. 13 illustrates aberrations of the imaging lens of Example 3.

Table 3A below shows lens data of the imaging lens of Example 3, and Table 3B shows aspherical coefficients of the imaging lens of Example 3.

TABLE 3A

Example 3
Lens Data

| Si | Ri | Di | re | Ndj | νdj |
|---|---|---|---|---|---|
| 1 | 11.3636 | 2.8010 | 0.000 | 1.58913 | 61.14 |
| 2 | 2.8396 | 2.2730 | 0.000 | | |
| (St) 3 | ∞ | 0.5000 | 3.650 | | |
| 4 | 9.5792 | 3.9310 | 0.000 | 1.75500 | 52.32 |
| 5 | −5.6579 | 1.0400 | 4.900 | | |
| *6 | 84.3931 | 0.9700 | 0.000 | 1.80518 | 25.42 |
| *7 | 3.7538 | 0.4290 | 5.300 | | |
| *8 | 10.5566 | 1.7720 | 0.000 | 1.77250 | 49.6 |
| *9 | −5.8446 | 6.6427 | 0.000 | | |
| 10 | ∞ | 0.5000 | 0.000 | 1.51680 | 64.2 |
| 11 | ∞ | 0.5000 | 0.000 | | |
| 12 | ∞ | 0.0000 | 0.000 | | |

※1. Third surface is aperture stop, twelfth surface is image plane, and tenth to eleventh surface are cover glass, filter, an the like.
※2. *mark indicates aspherical surface.
※3. re is light beam control diameter (third surface is optical aperture stop, fifth surface is flare stop diameter for removing coma flare that occurs in peripheral region and maintaining high performance, and 0.0 indicates no light beam control is provided)

TABLE 2B

Example 2: Aspherical Coefficients

| Variable Symbols | Surface Number i | | | | | |
|---|---|---|---|---|---|---|
| | *4 | *5 | *6 | *7 | *8 | *9 |
| C | 1.6656950112E−01 | −8.1129978338E−02 | 2.1346995410E−02 | 2.5800459248E−01 | 1.7977528090E−01 | −1.3559138181E−01 |
| K | 2.1967796410E−01 | 1.3612117870E+00 | 7.6440154560E+00 | −1.6787447330E−02 | −3.4765056070E+0 | −5.6276724470E+00 |
| B3 | 9.2905443040E−05 | −3.6788867930E−04 | 3.2394536050E−03 | 1.7690184210E−02 | 2.0226269830E−02 | 4.5181564380E−03 |
| B4 | 5.4405775750E−05 | −1.5043536830E−04 | −2.4752721820E−03 | 3.1056986540E−03 | 5.1771642790E−03 | 7.6795210700E−04 |
| B5 | 2.9071058840E−05 | −7.0634527690E−05 | −4.9880839810E−05 | −3.0733482340E−03 | −4.3996767640E−04 | −5.1288204380E−04 |
| B6 | 1.7861034790E−05 | −2.6067673290E−05 | −6.2293464140E−04 | −1.7290713350E−03 | −1.5811588930E−03 | 4.5468656850E−04 |
| B7 | 1.4405102600E−05 | −5.5133579230E−06 | −4.8643925690E−04 | −1.1660620410E−03 | −1.2755164600E−04 | 2.2915392480E−04 |
| B8 | −2.9472936100E−07 | 3.1984338310E−06 | 3.9060813660E−05 | 2.6811068330E−04 | −6.9500055010E−04 | −9.4804605880E−05 |
| B9 | −3.5610129530E−06 | 5.2047764770E−06 | 3.3444606580E−04 | 6.3744282120E−04 | 6.8838627470E−04 | −1.8143836400E−07 |
| B10 | 8.0063698400E−07 | −1.7121878470E−06 | −9.8796706870E−05 | −1.8878324900E−04 | −1.4193541280E−04 | 4.9381571250E−07 |

TABLE 3B

Example 3: Aspherical Coefficients

| Variable Symbols | Surface Number i | | | |
|---|---|---|---|---|
| | *6 | *7 | *8 | *9 |
| C  | 1.1849309955E−02 | 2.6639671799E−01 | 9.4727469071E−02 | −1.7109610765E−01 |
| K  | 0.0000000000E+00 | 0.0000000000E+00 | −3.1504000000E+00 | −5.2470000000E+00 |
| B3 | −1.7954663660E−03 | −4.9628215700E−03 | 1.4966822340E−03 | 6.0871297250E−03 |
| B4 | −1.0352115160E−02 | −6.9369399830E−03 | 8.5023510190E−04 | −9.3724034470E−03 |
| B5 | −1.1446045390E−03 | −8.7904513990E−04 | 2.2793280860E−03 | 3.5048225610E−03 |
| B6 | 1.9891550590E−04 | −7.4531618930E−05 | −9.1301290980E−05 | 5.1884248150E−04 |
| B7 | 3.5574676200E−06 | −3.9610022980E−04 | 8.5330883260E−05 | −4.7828159030E−04 |
| B8 | −1.0708898410E−05 | 1.2338298860E−04 | −8.9236491970E−04 | 8.5020665150E−05 |
| B9 | 1.1716587990E−04 | 5.8360751680E−05 | 4.3094165150E−04 | 0.0000000000E+00 |
| B10 | −3.5911152800E−05 | −1.7783713780E−05 | −5.7070085870E−05 | 0.0000000000E+00 |

Example 4

FIG. 7 is a cross-sectional view of an imaging lens of Example 4, schematically illustrating the configuration thereof with the optical paths of center light beam and outermost light beam passing through the imaging lens.

The imaging lens of Example 4 is configured to satisfy the conditional expressions (1) to (7).

Figure 14:
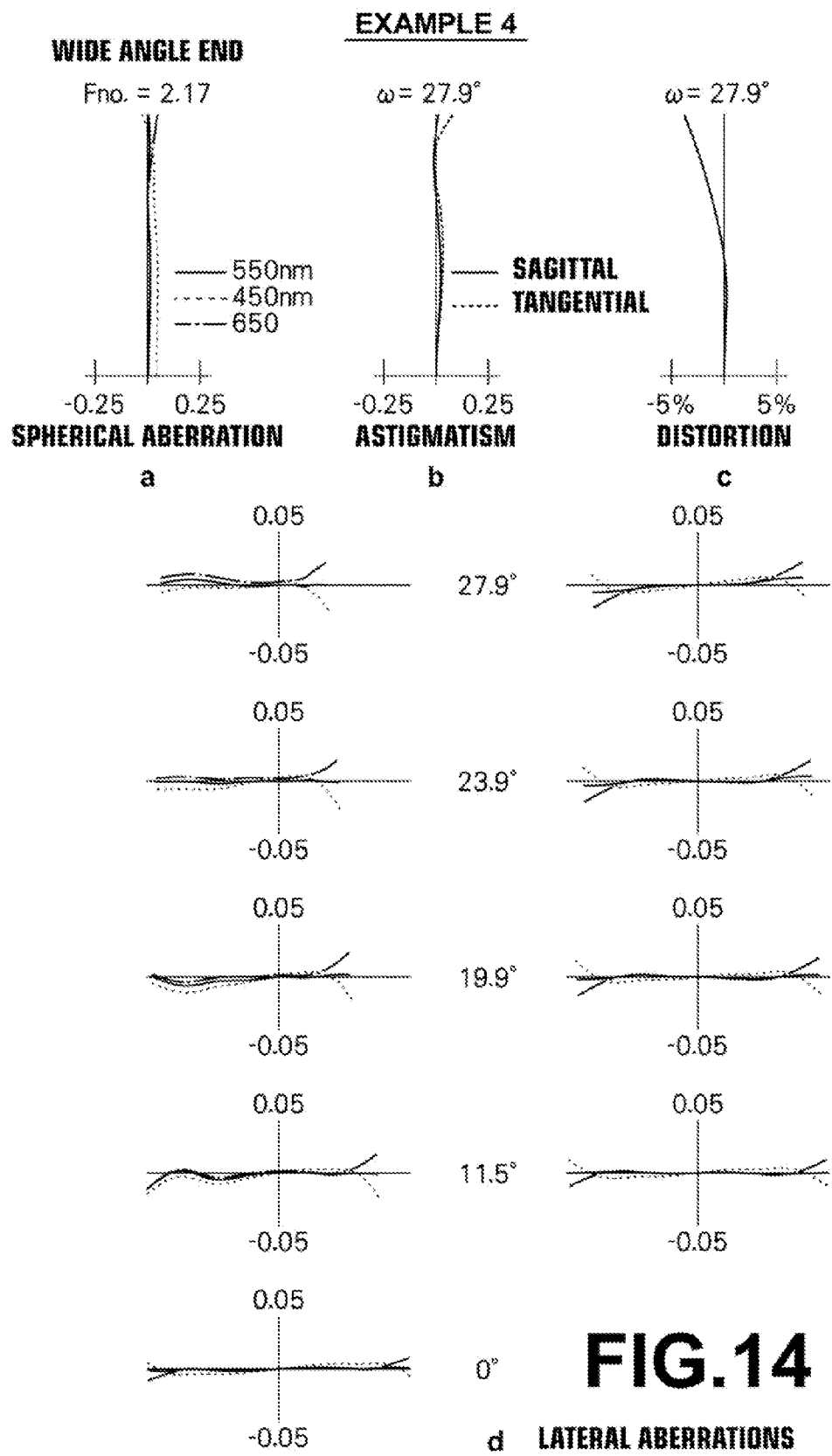
FIG. 14 illustrates aberration diagrams of the imaging lens of Example 4.

FIG. 14 illustrates aberrations of the imaging lens of Example 4.

Table 4A below shows lens data of the imaging lens of Example 4, and Table 4B shows aspherical coefficients of the imaging lens of Example 4.

TABLE 4A

Example 4
Lens Data

| Si | Ri | Di | re | Ndj | ν dj |
|---|---|---|---|---|---|
| 1 | 13.9163 | 1.6300 | 0.000 | 1.58913 | 61.14 |
| 2 | 3.0525 | 1.2530 | 0.000 | | |
| (St) 3 | ∞ | 2.1340 | 3.410 | | |
| 4 | 6.9490 | 3.0170 | 0.000 | 1.75500 | 52.32 |
| 5 | −8.6007 | 0.9440 | 5.200 | | |
| *6 | 18.5235 | 0.6000 | 0.000 | 1.63360 | 23.59 |
| *7 | 3.1643 | 0.4160 | 0.000 | | |
| *8 | 4.8652 | 2.4010 | 0.000 | 1.53391 | 55.96 |
| *9 | −7.8743 | 6.6211 | 0.000 | | |
| 10 | ∞ | 0.5000 | 0.000 | 1.51680 | 64.2 |
| 11 | ∞ | 0.5000 | 0.000 | | |
| 12 | ∞ | 0.0000 | 0.000 | | |

※1. Third surface is aperture stop, twelfth surface is image plane, and tenth to eleventh surface are cover glass, filter, an the like.
※2. *mark indicates aspherical surface.
※3. re is light beam control diameter (third surface is optical aperture stop, fifth surface is flare stop diameter for removing coma flare that occurs in peripheral region and maintaining high performance, and 0.0 indicates no light beam control is provided)

TABLE 4B

Example 4: Aspherical Coefficients

| Variable Symbols | Surface Number i | | | |
|---|---|---|---|---|
| | *6 | *7 | *8 | *9 |
| C  | 5.3985477906E−02 | 3.1602566128E−01 | 2.0554139604E−01 | −1.2699541547E−01 |
| K  | 0.0000000000E+00 | 0.0000000000E+00 | −3.1504000000E+00 | −5.2470000000E+00 |
| B3 | −4.6096295020E−03 | −1.5564246500E−02 | −5.6821956940E−03 | 6.8804111320E−03 |
| B4 | −3.7143502380E−03 | 7.3350387020E−03 | 9.3639243590E−03 | −5.2875775340E−03 |
| B5 | −1.1483986400E−04 | 9.6142573570E−05 | 1.6849371970E−03 | 1.6475867330E−03 |
| B6 | −5.0239182150E−05 | −8.2059910290E−04 | −4.6551902540E−04 | 4.6790461020E−04 |
| B7 | −2.1481643550E−04 | −9.5894153570E−04 | 6.9274350400E−05 | −5.3416664210E−05 |
| B8 | −1.0873226080E−04 | −3.3157106660E−06 | −8.1250150870E−04 | −2.6428907990E−05 |
| B9 | 1.6698293950E−04 | 2.88S6876300E−04 | 4.1360499730E−04 | 0.0000000000E+00 |
| B10 | −3.5768120150E−05 | −6.1541945530E−05 | −5.7821111950E−05 | 0.0000000000E+00 |

Example 5

FIG. 8 is a cross-sectional view of an imaging lens of Example 5, schematically illustrating the configuration thereof with the optical paths of center light beam and outermost light beam passing through the imaging lens.

The imaging lens of Example 5 is configured to satisfy the conditional expressions (1) to (7) and conditional expression (8).

Figure 15:
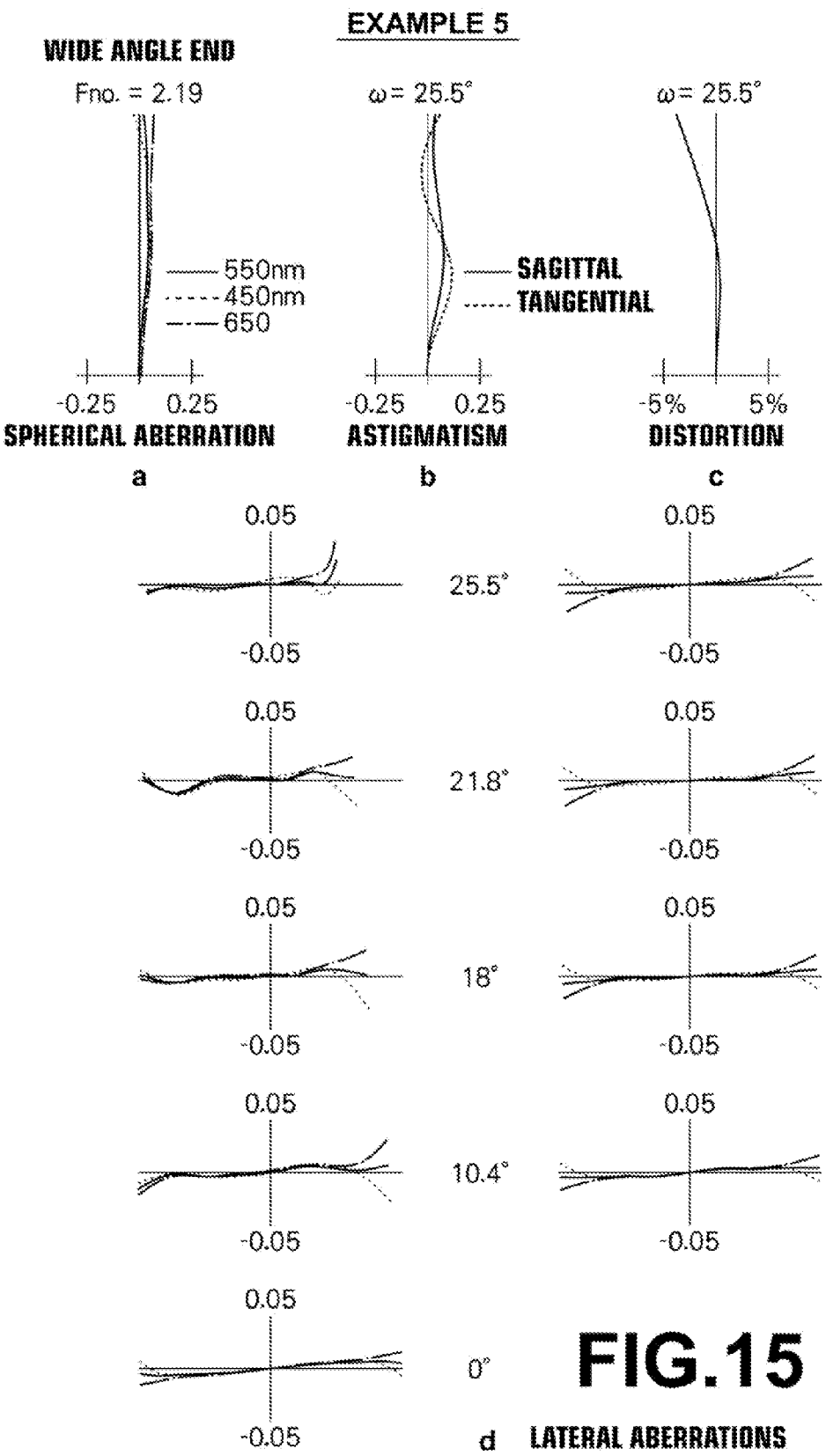
FIG. 15 illustrates aberration diagrams of the imaging lens of Example 5.

FIG. 15 illustrates aberrations of the imaging lens of Example 5.

Table 5A below shows lens data of the imaging lens of Example 5, and Table 5B shows aspherical coefficients of the imaging lens of Example 5.

Example 6

FIG. 9 is a cross-sectional view of an imaging lens of Example 6, schematically illustrating the configuration thereof with the optical paths of center light beam and outermost light beam passing through the imaging lens.

The imaging lens of Example 6 is configured to satisfy the conditional expressions (1) to (7) and conditional expression (8).

Figure 16:
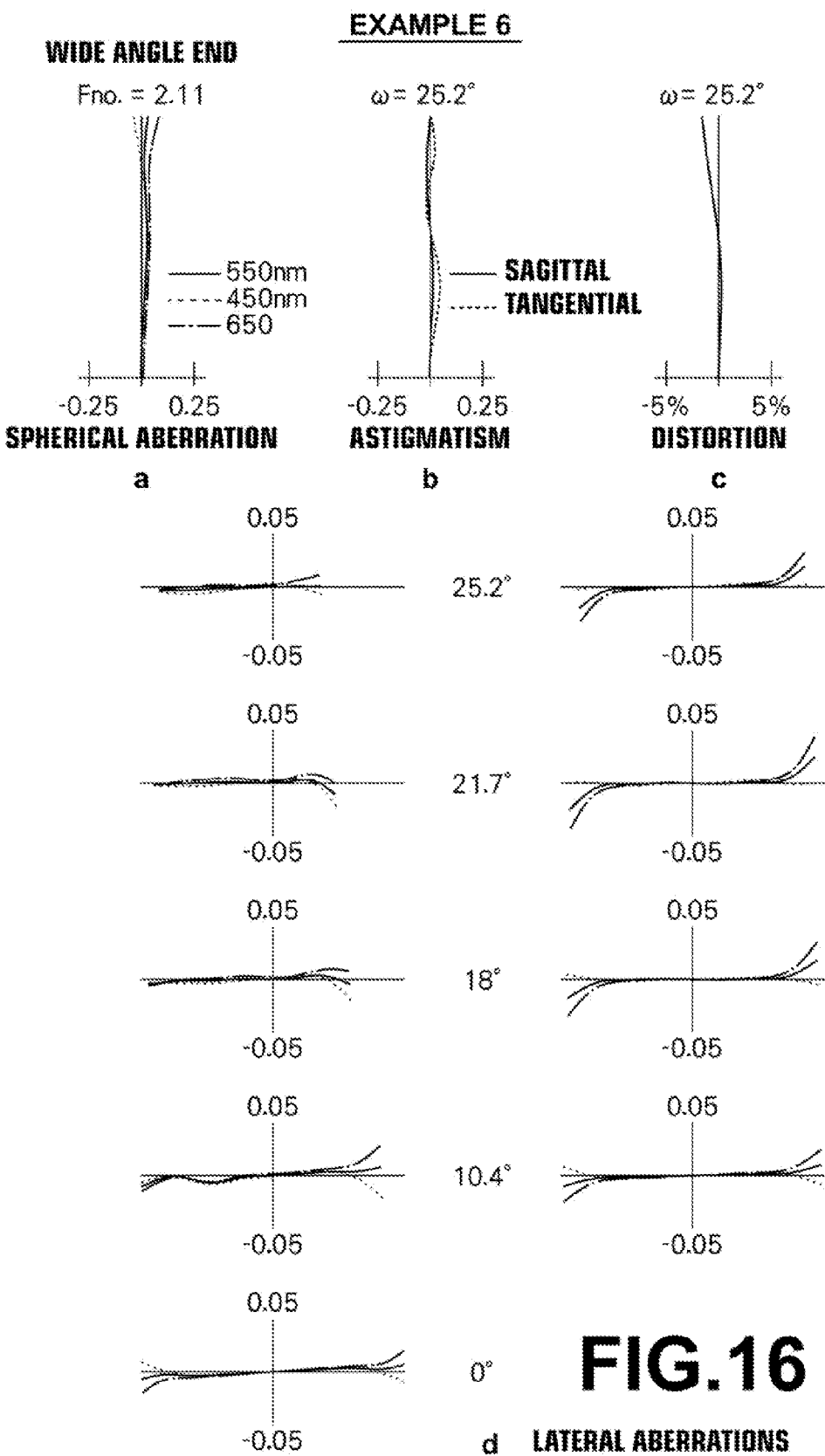
FIG. 16 illustrates aberration diagrams of the imaging lens of Example 6.

FIG. 16 illustrates aberrations of the imaging lens of Example 6.

Table 6A below shows lens data of the imaging lens of Example 6, and Table 6B shows aspherical coefficients of the imaging lens of Example 6.

TABLE 5A

Example 5 Lens Data

| Si | Ri | Di | re | Ndj | νdj |
|---|---|---|---|---|---|
| *1 | 12.5730 | 2.2000 | 0.000 | 1.48749 | 70.23 |
| *2 | 2.7955 | 1.3190 | 0.000 | | |
| (St) 3 | ∞ | 0.6000 | 3.690 | | |
| 4 | 14.3411 | 4.6440 | 0.000 | 1.75500 | 52.32 |
| 5 | −5.3834 | 0.7000 | 5.700 | | |
| *6 | 9.2594 | 1.3510 | 0.000 | 1.63360 | 23.59 |
| *7 | 2.7555 | 0.6200 | 5.700 | | |
| *8 | 5.9604 | 2.5000 | 0.000 | 1.53391 | 55.96 |
| *9 | −7.2648 | 6.5745 | 0.000 | | |
| 10 | ∞ | 0.5000 | 0.000 | 1.51680 | 64.2 |
| 11 | ∞ | 0.5000 | 0.000 | | |
| 12 | ∞ | 0.0000 | 0.000 | | |

※1. Third surface is aperture stop, twelfth surface is image plane, and tenth to eleventh surface are cover glass, filter, an the like.
※2. *mark indicates aspherical surface.
※3. re is light beam control diameter (third surface is optical aperture stop, fifth surface is flare stop diameter for removing coma flare that occurs in peripheral region and maintaining high performance, and 0.0 indicates no light beam control is provided)

TABLE 6A

Example 6 Lens Data

| Si | Ri | Di | re | Ndj | νdj |
|---|---|---|---|---|---|
| 1 | 14.6166 | 2.0030 | 0.000 | 1.48749 | 70.23 |
| 2 | 2.8477 | 1.0000 | 0.000 | | |
| (St) 3 | ∞ | 0.6070 | 3.610 | | |
| 4 | 10.6670 | 5.0810 | 0.000 | 1.60311 | 60.64 |
| 5 | −4.7347 | 0.7620 | 0.000 | | |
| *6 | 9.2593 | 1.9760 | 5.240 | 1.63360 | 23.59 |
| *7 | 2.9289 | 0.7000 | 0.000 | | |
| *8 | 5.9564 | 2.2700 | 0.000 | 1.53391 | 55.96 |
| *9 | −7.3712 | 6.2098 | 0.000 | | |
| 10 | ∞ | 0.5000 | 0.000 | 1.51680 | 64.2 |
| 11 | ∞ | 0.5000 | 0.000 | | |
| 12 | ∞ | 0.0000 | 0.000 | | |

※1. Third surface is aperture stop, twelfth surface is image plane, and tenth to eleventh surface are cover glass, filter, an the like.
※2. *mark indicates aspherical surface.
※3. re is light beam control diameter (third surface is optical aperture stop, fifth surface is flare stop diameter for removing coma flare that occurs in peripheral region and maintaining high performance, and 0.0 indicates no light beam control is provided)

TABLE 5B

Example 5: Aspherical Coefficents

| Variable Symbols | Surface Number i | | | | | |
|---|---|---|---|---|---|---|
| | *1 | *2 | *6 | *7 | *8 | *9 |
| C | 7.9535512606E−02 | 3.5771776069E−01 | 1.0799835842E−01 | 3.6291054255E−01 | 1.6777397490E−01 | −1.3765003854E−01 |
| K | −5.0002767740E+00 | 1.1612726600E+00 | 0.0000000000E+00 | 0.0000000000E+00 | −3.1504000000E+00 | −5.2470000000E+00 |
| B3 | 3.0252409620E−04 | −2.1583684600E−03 | −5.8140608220E−03 | −1.6578630570E−02 | −6.5276825510E−03 | 5.2358194660E−03 |
| B4 | −9.7585954340E−04 | −1.0506900090E−03 | −5.2073374210E−03 | −1.3967617970E−03 | 2.8309460960E−03 | −6.5269529890E−03 |
| B5 | 1.7787594380E−04 | −1.3362216670E−03 | −2.5197853420E−04 | −3.9537661330E−03 | 2.6616258120E−03 | 2.6363577410E−03 |
| B6 | 2.9576824330E−05 | −2.0600431850E−04 | 7.7789521780E−05 | −2.3017516830E−04 | −5.1324459640E−05 | 2.8383821180E−04 |
| B7 | −1.4147132220E−05 | 9.0827456360E−04 | −9.7583816450E−05 | −6.1748664170E−04 | 6.5263318270E−05 | −3.5050116550E−04 |
| B8 | −7.0735848760E−06 | −1.6909339870E−04 | −8.0772050770E−05 | 5.9077005900E−05 | −9.0108031490E−04 | 5.9167301820E−05 |
| B9 | 2.9100050510E−06 | −2.9002807110E−04 | 1.0610578650E−04 | 1.4708980080E−04 | 4.3186018140E−04 | 0.0000000000E+00 |
| B10 | −2.0375588510E−07 | 8.8527897490E−05 | −2.1678025510E−05 | −3.2775773030E−05 | −5.6586740420E−05 | 0.0000000000E+00 |

TABLE 6B

Example 6: Aspherical Coefficients

| Variable Symbols | Surface Number i | | | |
|---|---|---|---|---|
| | *6 | *7 | *8 | *9 |
| C | 1.0799952480E−01 | 3.4142510840E−01 | 1.6788664294E−01 | −1.3566312134E−01 |
| K | 0.0000000000E+00 | 0.0000000000E+00 | −3.1504000000E+00 | −5.2470000000E+00 |
| B3 | −8.1247927380E−04 | 7.2962800530E−04 | 7.6301267070E−03 | 8.3588914520E−03 |
| B4 | −4.6235595230E−03 | −1.2768552440E−02 | −7.9184307730E−03 | −9.6288695110E−03 |
| B5 | −6.7479983550E−04 | 1.9891451440E−03 | 3.1263316640E−03 | 4.3350183070E−03 |
| B6 | 5.4239262340E−04 | 3.8248931000E−04 | 6.0343577600E−04 | −8.5257568450E−05 |
| B7 | −7.566060984E−05 | −5.1001676170E−04 | 1.0611077030E−04 | −4.6600129130E−04 |
| B8 | −1.3292278660E−04 | −4.4876885450E−05 | −9.0646908330E−05 | 1.0222693980E−04 |
| B9 | 8.9722261650E−05 | 1.3711072580E−04 | 4.1570386590E−04 | 0.0000000000E+00 |
| B10 | −1.5885734590E−05 | −2.8146093860E−05 | −5.4179608440E−05 | 0.0000000000E+00 |

Example 7

FIG. 10 is a cross-sectional view of an imaging lens of Example 7, schematically illustrating the configuration thereof with the optical paths of center light beam and outerost light beam passing through the imaging lens.

The imaging lens of Example 7 is configured to satisfy the conditional expressions (1) to (7) and conditional expression (8).

Figure 17:
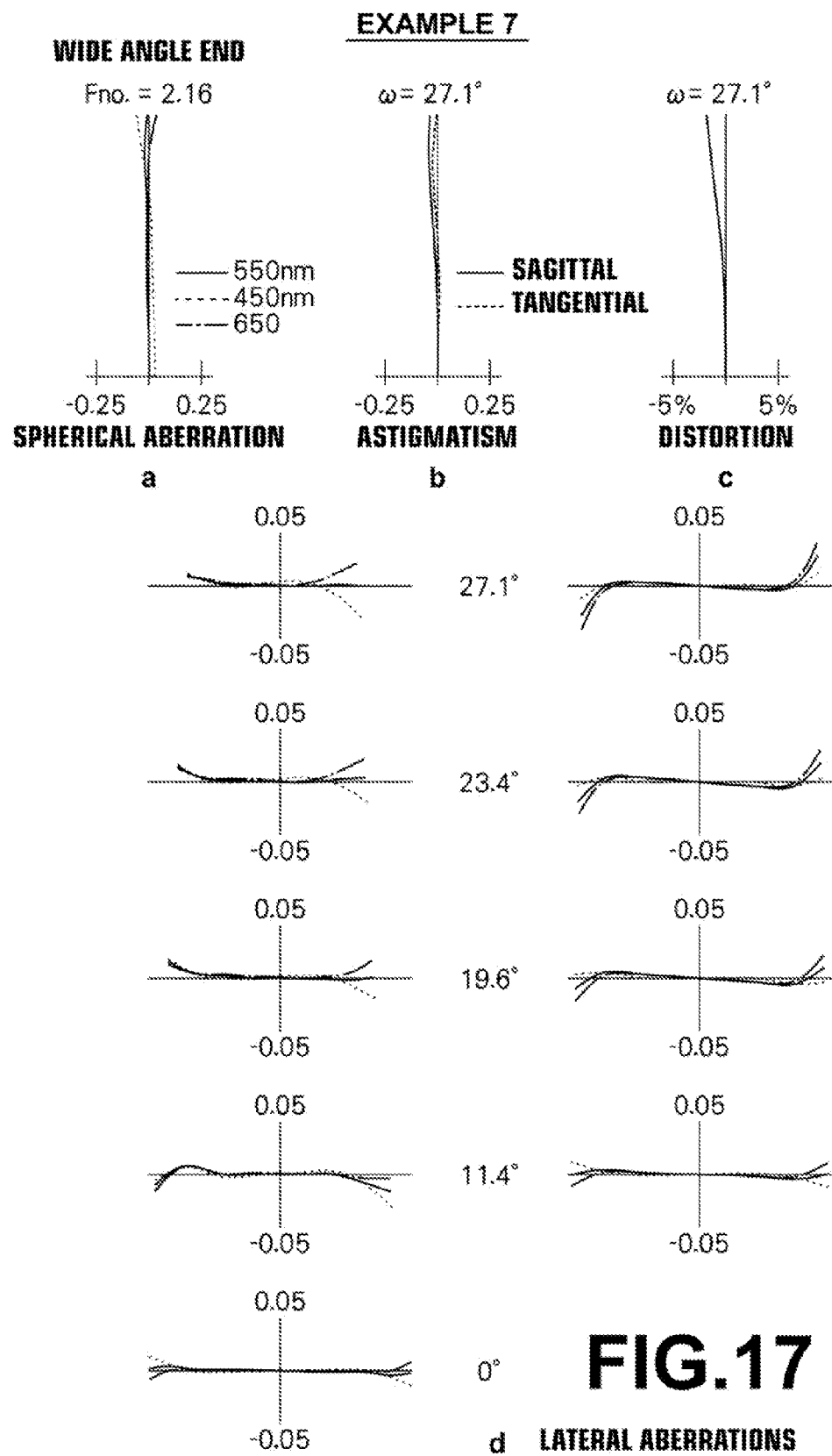
FIG. 17 illustrates aberration diagrams of the imaging lens of Example 7.

FIG. 17 illustrates aberrations of the imaging lens of Example 6.

Table 7A below shows lens data of the imaging lens of Example 7, and Table 7B shows aspherical coefficients of the imaging lens of Example 7.

Note that, unlike the imaging lenses of Examples 1 to 6, the imaging lens of Example 7 does not include an aperture stop.

TABLE 7A

Example 7
Lens Data

| Si | Ri | Di | re | Ndj | ν dj |
|---|---|---|---|---|---|
| 1 | 14.7058 | 2.1990 | 0.000 | 1.48749 | 70.23 |
| 2 | 2.6316 | 1.2020 | 0.000 | | |
| 3 | 11.9056 | 5.2760 | 3.600 | 1.72915 | 54.68 |
| 4 | −4.5587 | 0.9750 | 4.500 | | |
| *5 | 15.0055 | 1.0170 | 0.000 | 1.63360 | 23.59 |
| *6 | 2.9343 | 0.6000 | 0.000 | | |
| *7 | 8.6897 | 2.0100 | 0.000 | 1.53391 | 55.96 |
| *8 | −4.6846 | 6.4318 | 0.000 | | |
| 9 | ∞ | 0.5000 | 0.000 | 1.51680 | 64.2 |
| 10 | ∞ | 0.5000 | 0.000 | | |
| 11 | ∞ | 0.0000 | 0.000 | | |

※1. Third surface is aperture stop, twelfth surface is image plane, and tenth to eleventh surface are cover glass, filter, an the like.
※2. *mark indicates aspherical surface.
※3. re is light beam control diameter (third surface is optical aperture stop, fifth surface is flare stop diameter for removing coma flare that occurs in peripheral region and maintaining high performance, and 0.0 indicates no light beam control is provided)

TABLE 7B

Example 7: Aspherical Coefficients

| Variable Symbols | Surface Number i | | | |
|---|---|---|---|---|
| | *5 | *6 | *7 | *8 |
| C | 6.6422231182E−02 | 3.4079678288E−01 | 1.1507877142E−01 | −2.1346539726E−01 |
| K | 0.0000000000E+00 | 0.0000000000E+00 | −3.1504000000E+00 | −5.2470000000E−00 |
| B3 | −4.0855488020E−03 | −5.8487669770E−03 | 2.6971550740E−03 | 3.8497177570E−03 |
| B4 | −1.6763331320E−02 | −2.8180042620E−02 | −1.0239089370E−02 | −1.0206166610E−02 |
| B5 | 7.8728938350E−04 | 4.3879245040E−03 | 4.0666180590E−03 | 9.4940085030E−04 |
| B6 | −4.2967337290E−04 | 1.2114007520E−03 | −2.6042942240E−04 | 2.0245779900E−03 |
| B7 | 6.4449110290E−04 | −4.5982143870E−04 | 7.65140345110E−05 | −1.0504064170E−03 |
| B8 | 2.5229617490E−04 | −5.3692830250E−05 | −8.4138713580E−04 | 1.9272619810E−04 |
| B9 | −2.2932973330E−04 | 5.5837367110E−05 | 4.5103697660E−04 | 0.0000000000E+00 |
| B10 | 3.6588045530E−05 | −6.9572090090E−06 | −6.2851266340E−05 | 0.0000000000E+00 |

Tables 8, 9 below shows values with respect to each conditional expression described above.

TABLE 8

Value of Each Formula in Conditional Expression

| Conditional Expression | Example 1 | Example 2 | Example 3 | Example 4 | Example 5 | Example 6 | Example 7 |
|---|---|---|---|---|---|---|---|
| (1) $L12/f < 0.82$ | 0.31 | 0.51 | 0.43 | 0.51 | 0.26 | 0.22 | 0.18 |
| (2) $2.3 < L12 * R2F^2/f^2 < 10.0$ | 7.21 | 2.78 | 6.15 | 3.73 | 7.33 | 3.44 | 3.79 |
| (3) $0.7 < Bf/f < 1.5$ | 1.02 | 1.13 | 1.16 | 1.13 | 1.01 | 0.97 | 1.08 |
| (4) $0.6 < f2/f < 1.1$ | 0.83 | 0.83 | 0.82 | 0.84 | 0.79 | 0.85 | 0.78 |
| (5) $-1.3 < f1/f < -0.9$ | -1.11 | -1.13 | -1.14 | -1.06 | -1.08 | -1.05 | -1.04 |
| (6) $48 < v1$ | 61.14 | 70.23 | 61.14 | 61.14 | 70.23 | 70.23 | 70.23 |
| (7) $-1.3 < f3/f4 < -0.8$ | -1.05 | -1.07 | -0.96 | -1.01 | -1.03 | -1.17 | -0.99 |
| (8) $1.0 < R2F/|R2B|$ | 2.51 | ★0.49 | 1.69 | ★0.81 | 2.66 | 2.25 | 2.61 |

★mark indicates value that does not satisfy conditional expression.

TABLE 9

Value Corresponding to Each Variable Symbol in Each Conditional expression

| Variable Symbol | Example 1 | Example 2 | Example 3 | Example 4 | Example 5 | Example 6 | Example 7 |
|---|---|---|---|---|---|---|---|
| f | 6.4143 | 6.6178 | 6.4314 | 6.6186 | 7.3388 | 7.2923 | 6.7023 |
| Bf | 6.5549 | 7.4866 | 7.4724 | 7.4507 | 7.4042 | 7.0394 | 7.2615 |
| f1 | -7.1011 | -7.4728 | -7.3171 | -7.0282 | -7.9611 | -7.6836 | -6.9922 |
| f2 | 5.3141 | 5.4794 | 5.2994 | 5.5545 | 5.7686 | 6.2076 | 5.2273 |
| f3 | -6.6611 | -6.7054 | -4.9054 | -6.1158 | -6.7341 | -7.6928 | -5.9514 |
| f4 | 6.3457 | 6.2418 | 5.1104 | 6.0278 | 6.5643 | 6.5591 | 6.0155 |
| L12 | 1.958 | 3.373 | 2.773 | 3.387 | 1.919 | 1.607 | 1.202 |
| R2F | 12.3100 | 6.0035 | 9.5792 | 6.9490 | 14.3411 | 10.6670 | 11.9056 |
| R2B | -4.9054 | -12.3259 | -5.6579 | -8.6007 | -5.3834 | -4.7347 | -4.5587 |

FIGS. 18 to 21 relate to shapes (aspherical shapes) of the object side surface Me of the third lens L3 of the imaging lens.

FIG. 18 illustrates a normal Ha to the object side surface Me at an intersection Qa between the principal ray of the outermost light beam passing through the object side surface Me of the third lens L3 of the imaging lens of Example 3 and the surface Me, an intersection Pa between the normal Ha and the optical axis Z1, a normal Hb to the object side surface Me at an intersection Qb between the outermost ray of the center light beam passing through the object side surface Me and the surface Me, and an intersection Pb between the normal Hb and the optical axis Z1.

This shows that the surface Me has an aspherical shape corresponding to the state shown in FIG. 2C (in the case of 1-C state).

FIG. 19 illustrates a normal Hb to the object side surface Me at an intersection Qb between the outermost ray of the center light beam passing through the object side surface Me of the third lens L3 of the imaging lens of Example 3 and the surface Me, an intersection Pb between the normal Hb and the optical axis Z1, a normal Hc to the object side surface Me at an intersection Qc between the outermost ray of the outermost light beam passing through the object side surface Me of the third lens L3 and the surface Me, and an intersection Pc between the normal Hc and the optical axis Z1.

This shows that the surface Me has an aspherical shape corresponding to the state shown in FIG. 3C (in the case of 2-C state).

FIG. 20 illustrates a normal Ha to the object side surface Me at an intersection Qa between the principal ray of the outermost light beam passing through the object side surface Me of the third lens L3 of the imaging lens of Example 6 and the surface Me, an intersection Pa between the normal Ha and the optical axis Z1, a normal Hb to the object side surface Me at an intersection Qb between the outermost ray of the center light beam passing through the object side surface Me and the surface Me, and an intersection Pb between the normal Hb and the optical axis Z1.

This shows that the surface Me has an aspherical shape corresponding to the state shown in FIG. 2A (in the case of 1-A state).

FIG. 21 illustrates a normal Hb to the object side surface Me at an intersection Qb between the outermost ray of the center light beam passing through the object side surface Me of the third lens L3 of the imaging lens of Example 6 and the surface Me, an intersection Pb between the normal Hb and the optical axis Z1, a normal Hc to the object side surface Me at an intersection Qc between the outermost ray of the outermost light beam passing through the object side surface Me of the third lens L3 and the surface Me, and an intersection Pc between the normal Hc and the optical axis Z1.

This shows that the surface Me has an aspherical shape corresponding to the state shown in FIG. 3A (in the case of 2-A state).

Figure 22:
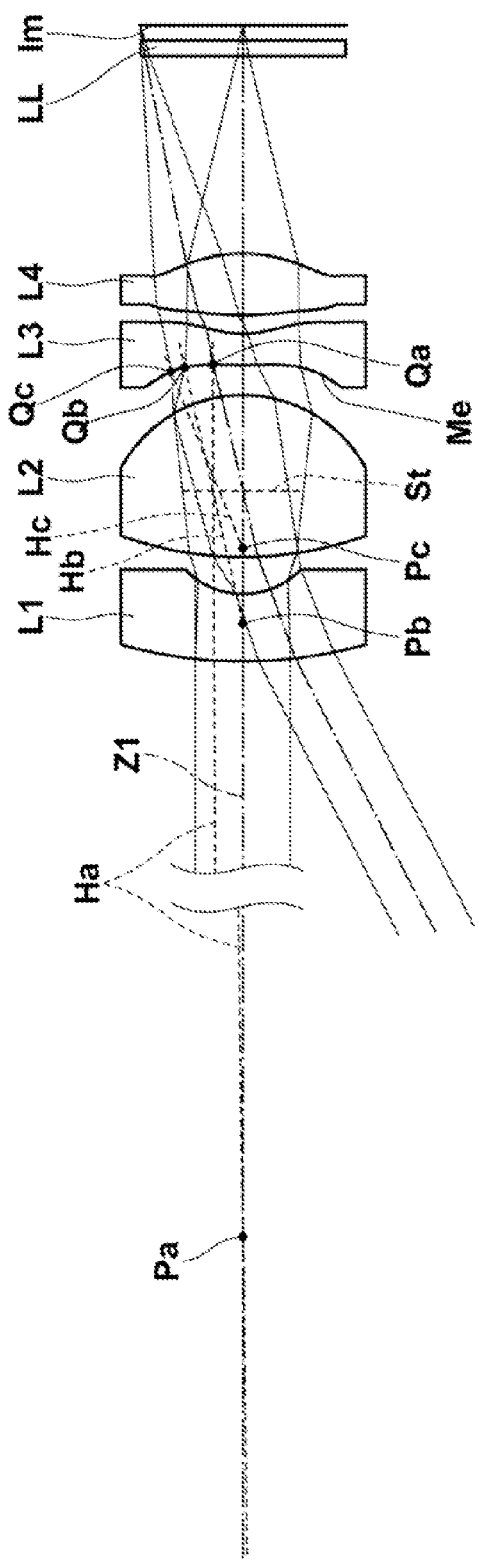
FIG. 22 illustrates intersections, normal lines, and the like for defining the shape of the object side surface of the third lens of the imaging lens of Example 7.

FIG. 22 illustrates normals Ha, Hb, Hc to the object side surface Me at intersections Qa, Qb, Qc between rays (principal ray of outermost light beam, outermost ray of center light beam, and outermost ray of outermost light beam) passing through the object side surface Me of the third lens L3 of the imaging lens of Example 7 and the surface Me, and intersections Pa, Pb, Pc between the normals Ha, Hb, Hcc and the optical axis Z1 respectively.

This shows that the surface Me has an aspherical shape corresponding to the states shown in FIG. 2C (in the case of 1-C state) and FIG. 3C (in the case of 2-C state).

As the imaging lens of Example 7 does not include an aperture stop, the angle bisector line in the cross-section of the outermost light beam when it is converged on the image plane is used as the principal ray of the outermost light beam.

Figure 23:
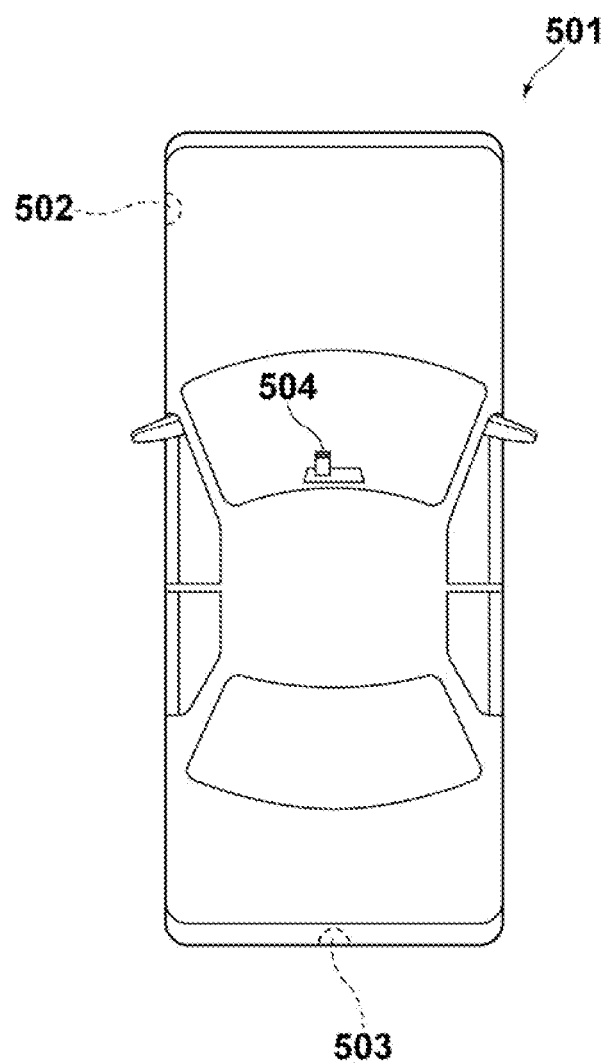
FIG. 23 illustrates an automobile equipped with an in-vehicle camera which is an example of an imaging apparatus of the present invention.

FIG. 23 illustrates an automobile equipped with an in-vehicle camera, which is an example of an imaging apparatus of the present invention, having the imaging lens of the present invention and an image sensor that receives light forming an optical image focused by the imaging lens, coverts the light to an electrical signal and outputs the electrical signal.

As illustrated in FIG. 23, in-vehicle cameras 502 to 504 can be installed in an automobile 501 and the like and used. The in-vehicle camera 502 is an exterior camera for imaging a dead area on the passenger side, and the in-vehicle camera 503 is an exterior camera for imaging the dead area on the rear side of the automobile 501. The in-vehicle camera 504 is an interior camera attached to the rear surface of the rearview mirror and used for imaging the same visual field range as that of the driver.

In the example of imaging apparatus, the description and illustration have been made of a case in which the present invention is applied to an in-vehicle camera. But the present invention is not limited to such applications and applicable, for example, to surveillance cameras, image reading cameras for deficiency detection, individual identification, and the like.

So far the present invention has been described by way of embodiments and examples, but the present invention is not limited to the embodiments and examples described above and various modifications can be made. For example, values of radius of curvature of each lens element, surface distance, refractive index, Abbe number, and the like are not limited to those shown in each numerical example and may take other values.

What is claimed is:

1. An imaging lens substantially consisting of four lenses, wherein the imaging lens is composed of a first lens having a meniscus shape with a convex surface on the object side and a negative refractive power, a second lens having a biconvex shape and a positive refractive power, a third lens having a concave surface on the image side and a negative refractive power, and a fourth lens having a convex surface on the object side and a positive refractive power arranged in order from the object side, and satisfies conditional expressions (1), (2), (5), and (6) given below simultaneously:

$$L12/f<0.82 \quad (1);$$

$$2.3<L12\times R2F^2/f^3<10.0 \quad (2),$$

$$-1.3<f1/f<-0.9 \quad (5);$$

and $$48<v1 \quad (6),$$

where:
L12: the distance (air equivalent distance) between the first lens and the second lens on the optical axis;
f: the focal length of the entire lens system;
R2F: the radius of curvature of the object side lens surface of the second lens;
f1: the focal length of the first lens; and
v1: the Abbe number of the first lens with respect to the d-line.

2. The imaging lens of claim 1, wherein the imaging lens satisfies a conditional expression (1a) given below:

$$L12/f<0.6 \quad (1a).$$

3. The imaging lens of claim 1, wherein the imaging lens satisfies a conditional expression (2a) given below:

$$3.0<L12\times R2F^2/f^3<8.0 \quad (2a).$$

4. The imaging lens of claim 1, wherein each of at least two of the first lens to the fourth lens is an aspherical lens having an aspherical surface on one or both surfaces.

5. The imaging lens of claim 1, wherein the imaging lens satisfies a conditional expression (3) given below:

$$0.7<Bf/f<1.5 \quad (3),$$

where,
Bf: the air equivalent back focus of the entire lens system.

6. The imaging lens of claim 5, wherein the imaging lens satisfies a conditional expression (3a) given below:

$$0.85<Bf/f<1.25 \quad (3a).$$

7. The imaging lens of claim 1, wherein the imaging lens satisfies a conditional expression (4) given below:

$$0.6<f2/f<1.1 \quad (4),$$

where,
f2: the focal length of the second lens.

8. The imaging lens of claim 7, wherein the imaging lens satisfies a conditional expression (4a) given below:

$$0.7<f2/f<0.9 \quad (4a).$$

9. The imaging lens of claim 1, wherein the imaging lens satisfies a conditional expression (5a) given below:

$$-1.2<f1/f<-2.0 \quad (6a).$$

10. The imaging lens of claim 1, wherein the imaging lens satisfies a conditional expression (6a) given below:

$$48<v1<82 \quad (6a).$$

11. The imaging lens of claim 1, wherein:
the third lens and the fourth lens are formed of a resin material; and
the imaging lens satisfies a conditional expression (7) given below:

$$-1.3<f3/f4<-0.8 \quad (7),$$

where:
f3: the focal length of the third lens; and
f4: the focal length of the fourth lens.

12. The imaging lens of claim 11, wherein the imaging lens satisfies a conditional expression (7a) given below:

$$-1.2<f3/f4<-0.9 \quad (7a).$$

13. The imaging lens of claim 1, wherein the object side surface of the third lens has an aspherical shape formed such that:
in a case where a normal to the surface at a point where the principal ray of the outermost light beam passing through the imaging lens passes through the surface intersects with the optical axis at a point on the image side of the surface, a normal to the surface at a point where the outermost ray of the center light beam passing through the imaging lens passes through the surface intersects with the optical axis at a point on the image side of the intersecting point with the optical axis, becomes parallel to the optical axis, or intersects with the optical axis on the object side of the surface;
in a case where the normal to the surface at the point where the principal ray of the outermost light beam passes through the surface becomes parallel to the optical axis, the normal to the surface at the point where the outermost ray of the center light beam passes through the surface intersects with the optical axis on the object side of the surface; and
in a case where the normal to the surface at the point where the principal ray of the outermost light beam passes through the surface intersects with the optical axis at a point on the object side of the surface, the normal to the surface at the point where the outermost ray of the center light beam passes through the surface intersects with the optical axis at a point on the image side of the intersecting point with the optical axis.

14. The imaging lens of claim 1, wherein the object side surface of the third lens has an aspherical shape formed such that:
in a case where a normal to the surface at a point where the outermost ray of the center light beam passing through the imaging lens passes through the surface intersects with the optical axis at a point on the image side of the surface, a normal to the surface at a point where the outermost ray of the outermost light beam passing through the imaging lens passes through the surface intersects with the optical axis at a point on the image side of the intersecting point with the optical axis, becomes parallel to the optical axis, or intersects with the optical axis on the object side of the surface;
in a case where the normal to the surface at the point where the outermost ray of the center light beam passes through the surface becomes parallel to the optical axis, the normal to the surface at the point where the outermost ray of the outermost light beam passes through the surface intersects with the optical axis on the object side of the surface; and
in a case where the normal to the surface at the point where the outermost ray of the center light beam passes through the surface intersects with the optical axis at a point on the object side of the surface, the normal to the surface at the point where the outermost ray of the outermost light beam passes through the surface intersects with the optical axis at a point on the image side of the intersecting point with the optical axis.

15. The imaging lens of claim 1, wherein an aperture stop is provided between the first lens and the second lens.

16. The imaging lens of claim 2, wherein the imaging lens satisfies a conditional expression (2a) given below:

$$3.0 < L12 \times R2F^2/f^2 < 8.0 \tag{2a}$$

17. The imaging lens of claim 2, wherein each of at least two of the first lens to the fourth lens is an aspherical lens having an aspherical surface on one or both surfaces.

18. The imaging lens of claim 2, wherein the imaging lens satisfies a conditional expression (3) given below:

$$0.7 < Bf/f < 1.5 \tag{3}$$

where,
Bf: the air equivalent back focus of the entire lens system.

19. The imaging lens of claim 18, wherein the imaging lens satisfies a conditional expression (3a) given below:

$$0.85 < Bf/f < 1.25 \tag{3a}$$

20. An imaging apparatus, comprising the imaging lens of claim 1.

* * * * *